US007520339B2

(12) United States Patent
Ikenoya

(10) Patent No.: US 7,520,339 B2
(45) Date of Patent: Apr. 21, 2009

(54) APPARATUS FOR ACHIEVING INTEGRATED MANAGEMENT OF DISTRIBUTED USER INFORMATION

(75) Inventor: Kazuyuki Ikenoya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 806 days.

(21) Appl. No.: 11/039,895

(22) Filed: Jan. 24, 2005

(65) Prior Publication Data
US 2005/0188225 A1      Aug. 25, 2005

(30) Foreign Application Priority Data

| Jan. 26, 2004 | (JP) | ............................. 2004-017198 |
| Feb. 12, 2004 | (JP) | ............................. 2004-035001 |
| Jan. 11, 2005 | (JP) | ............................. 2005-004399 |

(51) Int. Cl.
  *B23Q 5/00* (2006.01)
(52) U.S. Cl. .......................................... 173/182; 726/2
(58) Field of Classification Search ........................ None
  See application file for complete search history.

(56) References Cited

U.S. PATENT DOCUMENTS

| 6,671,695 | B2 * | 12/2003 | McFadden | ................... 707/102 |
| 7,103,777 | B2 * | 9/2006 | Sakushima et al. | .......... 713/182 |
| 7,178,032 | B2 * | 2/2007 | Osada | ........................ 713/182 |
| 7,231,657 | B2 * | 6/2007 | Honarvar et al. | ................ 726/2 |
| 7,313,702 | B2 * | 12/2007 | Shimada et al. | ............. 713/184 |
| 2002/0083317 | A1 * | 6/2002 | Ohta et al. | ................... 713/161 |
| 2003/0074560 | A1 * | 4/2003 | Shimada et al. | ............. 713/170 |
| 2003/0126137 | A1 * | 7/2003 | McFadden | ................... 707/100 |
| 2004/0260839 | A1 * | 12/2004 | Onoda et al. | ................. 709/247 |
| 2005/0160160 | A1 * | 7/2005 | Wang | ......................... 709/223 |

FOREIGN PATENT DOCUMENTS

JP        2004-185396        7/2004

OTHER PUBLICATIONS

Kong, Q.; Integrating CORBA and TMN environments, Apr. 15, 1996, IEEE, vol. 1, pp. 86-96.*

* cited by examiner

*Primary Examiner*—Kambiz Zand
*Assistant Examiner*—Monjour Rahim
(74) *Attorney, Agent, or Firm*—Oblon, Spivak, McClelland, Maier & Neustadt, P.C.

(57) ABSTRACT

An apparatus for managing user information regarding a plurality of users includes a source determining unit configured to receive from a client a request for obtaining first user information and to determine, based on user identifying information contained in the request, a source from which the first user information is obtained, and two or more user information obtaining units each configured to serve as the source determined by the source determining unit to obtain the first user information, wherein at least one of the two or more user information obtaining units configured to transmit the request for obtaining first user information to another apparatus for managing user information via a network.

31 Claims, 23 Drawing Sheets

FIG.8

```
<?xml version="1.0" encoding="UTF-8"?>
<soapenv:Envelope xmlns:soapenv="http://schemas.xmlsoap.org/soap/envelope/"
 xmlns:xsd="http://www.w3.org/2001/XMLSchema"
 xmlns:xsi="http://www.w3.org/2001/XMLSchema-instance">
<soapenv:Body>
<ns1:authenticateByPassword
 soapenv:encodingStyle="http://schemas.xmlsoap.org/soap/encoding/"
 xmlns:ns1="http://www.xxxx">
<username xsi:type="xsd:string">aaa</username>
<password xsi:type="xsd:string">abc!</password>
<domainname xsi:type="xsd:string">DomA</domainname>
<duration xsi:type="xsd:int">3600</duration>
</ns1:authenticateByPassword>
</soapenv:Body>
</soapenv:Envelope>
```

FIG.9

| DOMAIN NAME | PROVIDER NAME |
|---|---|
| DomA | REMOTE PROVIDER A |
| DpmB | REMOTE PROVIDER B |
| DomC | LOCAL PROVIDER |
| : | : |

| DOMAIN NAME | PROVIDER NAME |
|---|---|
| DomA | LOCAL PROVIDER |
| DpmB | REMOTE PROVIDER C |
| DomC | REMOTE PROVIDER D |
| : | : |

| TICKET ID |
|---|
| VALID RANGE |
| TERM OF VALIDITY |
| AUTHENTICATION USER ID |
| MIC |
| : |

FIG.12

| TICKET | TICKET TYPE | ISSUING PROVIDER NAME | ISSUING AUTHENTICATION SERVER | TICKET DETAILED INFORMATION |
|---|---|---|---|---|
| TICKET A | MASTER | REMOTE PROVIDER A | AUTHENTICATION SERVER XX | ...... |
| TICKET B | AUTHENTICATION | REMOTE PROVIDER A | AUTHENTICATION SERVER XX | ...... |
| TICKET C | MASTER | LOCAL PROVIDER | LOCAL | ...... |

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema" xmlns:xsi="http://www.w3.org/2001/XMLSchema-
instance">
 <soapenv:Body>
  <ns1:authenticateByPasswordResponse
soapenv:encodingStyle="http://schemas.xmlsoap.org/soap/encoding/" xmlns:ns1="http://www.xxxx">
   <returnValue
xsi:type=" xsd:base64Binary">AJjhlZEsUBze9Ssp1qjAWTNXg4SP8KXVghpV/hfxldKNW/Xu/qZ8Nm4=</
returnValue>
  </ns1:authenticateByPasswordResponse>
 </soapenv:Body>
</soapenv:Envelope>
```

| TICKET | TICKET TYPE | ISSUING PROVIDER NAME | ISSUING AUTHENTICATION SERVER | TICKET DETAILED INFORMATION |
|---|---|---|---|---|
| .. | .. | .. | .. | .. |
| TICKET C | MASTER | REMOTE PROVIDER A | AUTHENTICATION SERVER 10b | ...... |
| .. | .. | .. | .. | .. |

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema" xmlns:xsi="http://www.w3.org/2001/XMLSchema-
instance">
  <soapenv:Body>
    <ns1:createAuthTicket soapenv:encodingStyle="http://schemas.xmlsoap.org/soap/encoding/"
xmlns:ns1="http://www.xxxx">
      <masterAuthTicket
xsi:type="xsd:base64Binary">AJjhIZEsUBze9Ssp1qjAWTNXg4SP8KXVghpV/hfxIdKNW/Xu/qZ8Nm4=</master
AuthTicket>
      <duration xsi:type="xsd:int">60</duration>
      <targets xsi:type="soapenc:Array" soapenc:arrayType="xsd:string[1]" xmlns:ns2="http://www.xxxx"
xmlns:soapenc="http://schemas.xmlsoap.org/soap/encoding/">
        <item>RepositoryA</item>
      </targets>
    </ns1:createAuthTicket>
  </soapenv:Body>
</soapenv:Envelope>
```

FIG.16

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
<soapenv:Body>
<ns1:createAuthTicketResponse
soapenv:encodingStyle="http://schemas.xmlsoap.org/soap/encoding/"
xmlns:ns1="http://www.xxxx">
<returnValue
xsi:type="xsd:base64Binary">AJjhIZEsUBzeySJ45pkTg6PimuLw/9IkBnA5uDAdz45X01K
Ry1oYlhEeh9bUTYg6UA==</returnValue>
</ns1:createAuthTicketResponse>
</soapenv:Body>
</soapenv:Envelope>
```

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema" xmlns:xsi="http://www.w3.org/2001/XMLSchema-
instance">
 <soapenv:Body>                 652
  <ns1:createAuthTicketBySSO soapenv:encodingStyle="http://schemas.xmlsoap.org/soap/encoding/"
xmlns:ns1="http://www.xxxx">
   <masterAuthTicket
xsi:type="xsd:base64Binary">AJjhlZEsUBze9Ssp1qjAWTNXg4SP8KXVghpV/hfxIdKNW/Xu/qZ8Nm4=</master
AuthTicket>                                                     653
   <duration xsi:type="xsd:int">60</duration>  654
   <targets xsi:type=" soapenc:Array" soapenc:arrayType=" xsd:string[1]" xmlns:ns2="http://www. xxxx"
xmlns:soapenc="http://schemas.xmlsoap.org/soap/encoding/">
    <item>RepositoryB</item>
   </targets>
   <ua_uri xsi:type="xsd:string">http://UA1:8080/aaa/bbb/ccc</ua_uri>  656
  </ns1:createAuthTicket>
 </soapenv:Body>
</soapenv:Envelope>
```

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
<soapenv:Body>
<ns1:createAuthTicketBySSOResponse
soapenv:encodingStyle="http://schemas.xmlsoap.org/soap/encoding/"
xmlns:ns1="http://www.xxxx">
<returnValue
xsi:type="xsd:base64Binary">AJjhlZEsUBzeySJ45pkTg6PimuLw/9IkBnA5uDAdz45X01K
Ry1oYlhEeh9bUTYg6UA==</returnValue>
</ns1:createAuthTicketBySSOResponse>
</soapenv:Body>
</soapenv:Envelope>
```

66

APPARATUS FOR ACHIEVING INTEGRATED MANAGEMENT OF DISTRIBUTED USER INFORMATION

BACKGROUND OF THE INVENTION

1. Field of the Invention

The present invention generally relates to a user information managing apparatus, user information managing program, and record medium having such program embodied therein for managing information regarding users.

2. Description of the Related Art

In order to use the services of a server connected to a network, a client is generally required to present a user name and password or the like (hereinafter referred to as "user name and the like") to the server. This serves to prevent unauthorized access to the server.

FIG. 1 is a drawing showing an example in which a client starts using a document management server. In FIG. 1, a document management server 501 is a computer in which a function to manage document information is implemented. A client 502 is a computer that uses the function of the document management server 501. A user management server 503 is a computer having the functions implemented therein to authenticate users based on user names and passwords, to provide user information, etc. That is, the user management server 503 has a database (hereinafter referred to as "user DB") comprised of a correspondence table that includes user names and associated passwords, and attends to user authentication and the like based on the user DB.

The client 502 may transmit (S1) to the document management server 501 a user name and the like that are entered by the user on a login window or the like in an attempt to use the function of the document management server 501.

Having received the user name and the like, the document management server 501 requests (S2) the user management server 503 to authenticate the user based on the user name and the like. Here, the user management server 503 is selected in advance as an agency to which such an authentication request should be sent.

The user management server 503 authenticates the user based on the user name and the like, and sends (S3) the results to the document management server 501.

If the user is properly authenticated, the document management server 501 provides (S4) its service to the client 502.

In FIG. 1 as described above, the service of the document management server 501 is provided only to the users whose names and the like are managed by the user management server 503. This can effectively prevent access from unauthorized users, the leakage and/or tampering of confidential information, etc.

FIG. 1 illustrates an example in which the document management server 501 and the user management server 503 are implemented by use of separate hardware units. Alternatively, a construction in which the function of the user management server 503 is incorporated in the document management server 501 is conventionally used as well.

From the viewpoint of convenience of maintenance and the like, the user management server may be provided separately for each service (the service of the document management server in this example). FIG. 2 is a drawing showing an example in which a user management server is provided separately for each service. In FIG. 2, user management servers 503a, 503b, and 503c are provided separately for respective document management servers 501a, 501b, and 501c. In order to use the service of the document management server 501a, the client 502 needs to be authenticated by the user management server 503a. By the same token, the client 502 needs to be authenticated by the user management server 503b in order to use the service of the document management server 501b, and needs to be authenticated by the user management server 503c in order to use the service of the document management server 501c.

Namely, in the system configuration as shown in FIG. 2, the client 502 needs to be authenticated by a different user management server each time the services (document management servers) to be used are switched. This means that there is a need to request the user to enter the user name and password or the like each time the services to be used are switched. This is the case even when the user using these services is one and the same, and the user name and the like of this user are managed by use of the same value in the respective user management servers.

Such situation not only increases the load on the system unduly, but also gives the feeling of excessive cumbersomeness to the user.

Accordingly, there is a need for a user information managing apparatus, user information managing program, and record medium having such program embodied therein for providing the integrated management of user information that are distributed to a plurality of computers.

SUMMARY OF THE INVENTION

It is a general object of the present invention to provide a user information managing apparatus, user information managing program, and record medium having such program embodied therein that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a user information managing apparatus, user information managing program, and record medium having such program embodied therein particularly pointed out in the specification in such full, clear, concise, and exact terms as to enable a person having ordinary skill in the art to practice the invention.

To achieve these and other advantages in accordance with the purpose of the invention, the invention provides a first apparatus for managing user information regarding a plurality of users, which includes a source determining unit configured to receive from a client a request for obtaining first user information and to determine, based on user identifying information contained in the request, a source from which the first user information is obtained, and two or more user information obtaining units each configured to serve as the source determined by the source determining unit to obtain the first user information, wherein at least one of the two or more user information obtaining units configured to transmit the request for obtaining first user information to another apparatus for managing user information via a network.

According to a further aspect of the present invention, a second apparatus for managing user information includes a first authentication information providing unit configured to authenticate the user based on the user identifying information contained in the authentication request in response to the authentication request transmitted from the first apparatus as described above, and to provide the first authentication information in response to proper authentication of the user, and a second authentication information providing unit configured to respond to a request for obtaining second user information, accompanied by the first authentication information, issued from the client that has received the first authentication information from the first apparatus as described above, to provide second authentication information that is to be required to be presented to a predetermined service when the client uses the predetermined service.

According to a further aspect of the present invention, a third apparatus for managing user information includes a first authentication information providing unit configured to authenticate a user based on user identifying information contained in an authentication request in response to the authentication request sent from a second client, and to provide first authentication information indicative of proper authentication of the user in response to the proper authentication of the user, and a second authentication information providing unit configured to respond to a request for obtaining second user information issued from the first apparatus as described above that has received the request for obtaining second user information, accompanied by the first authentication information, issued from the second client, to provide second authentication information that is to be required to be presented to a predetermined service when the second client uses the predetermined service.

According to at lease one embodiment of the present invention, the first apparatus as described above is operable to entrust another apparatus for managing user information with a task relating to user attribute information outside its responsibility, and the second and third apparatuses are configured to perform the task entrusted from the first apparatus. This achieves the integrated management of user information that are distributed to a plurality of computers.

The present invention further provides a machine-readable medium having a program embodied therein for causing a computer to manage user information, such that the computer serves as one of the first through third apparatuses described above.

BRIEF DESCRIPTION OF THE DRAWINGS

Other objects and further features of the present invention will be apparent from the following detailed description when read in conjunction with the accompanying drawings, in which:

FIG. 8 is a drawing showing an example of a SOAP message used at the time of calling an authentication method;

FIG. 9 is a drawing showing an example of the construction of a routing information managing table in the authentication service;

FIG. 10 is a drawing showing an example of the construction of a routing information managing table in the authentication service;

FIG. 11 is a drawing showing an example of the data structure of a ticket;

FIG. 12 is a drawing showing an example of the construction of a ticket managing table in the authentication service;

FIG. 13 is a drawing showing an example of a SOAP message inclusive of a return value from an authentication method;

FIG. 14 is a drawing showing an example of the construction of a ticket managing table in the authentication service;

FIG. 15 is a drawing showing an example of the SOAP message that is used at the time of calling a method for issuing an authentication ticket;

FIG. 16 is a drawing showing an example of the SOAP message inclusive of a return value from a method for issuing an authentication ticket;

FIG. 18 is a drawing. showing an example of the SOAP message used at the time of calling a second method for issuing an authentication ticket;

FIG. 20 is a drawing showing an example of the SOAP message inclusive of a return value from the second method for issuing an authentication ticket;

DESCRIPTION OF THE PREFERRED EMBODIMENTS

In the following, embodiments of the present invention will be described with reference to the accompanying drawings.

Figure 1:
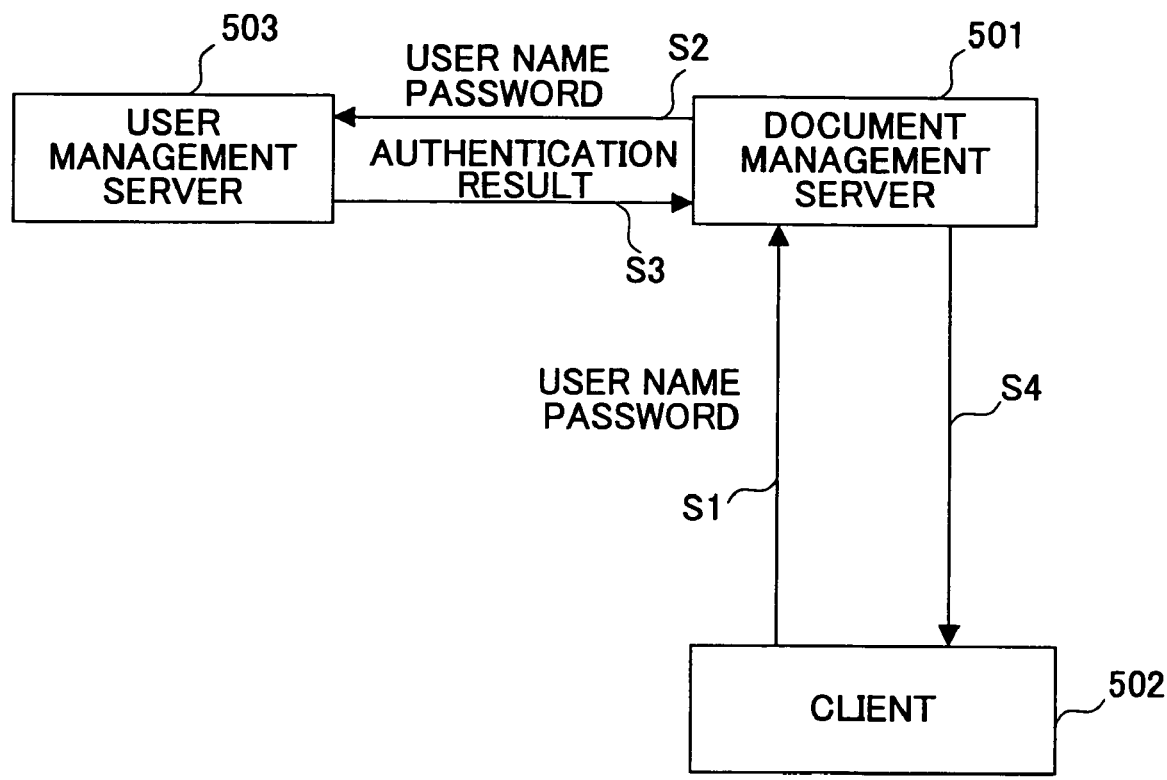
FIG. 1 is a drawing showing an example in which a client starts using a document management server.
Figure 2:
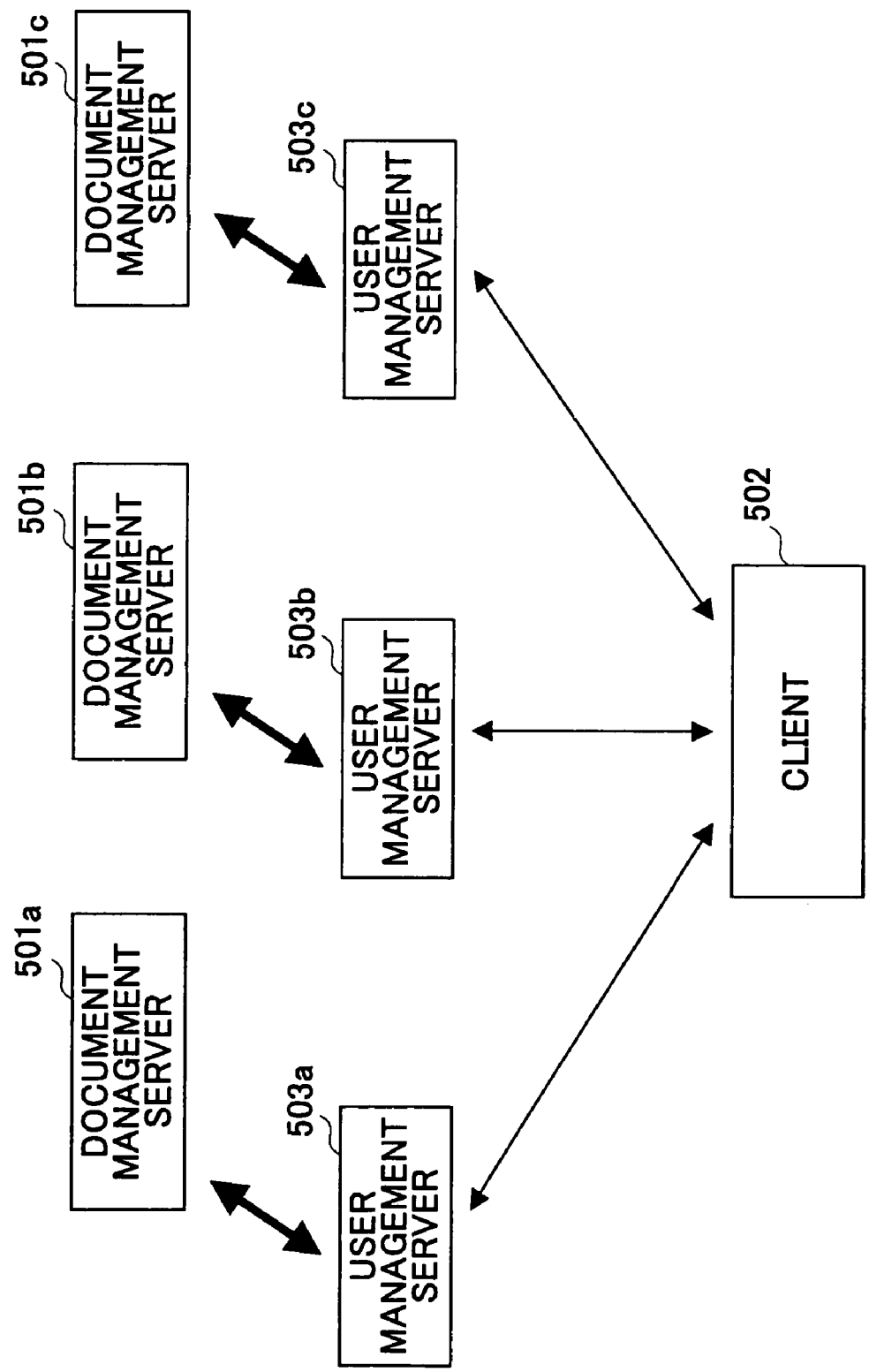
FIG. 2 is a drawing showing an example in which a user management server is provided separately for each service.
Figure 3:
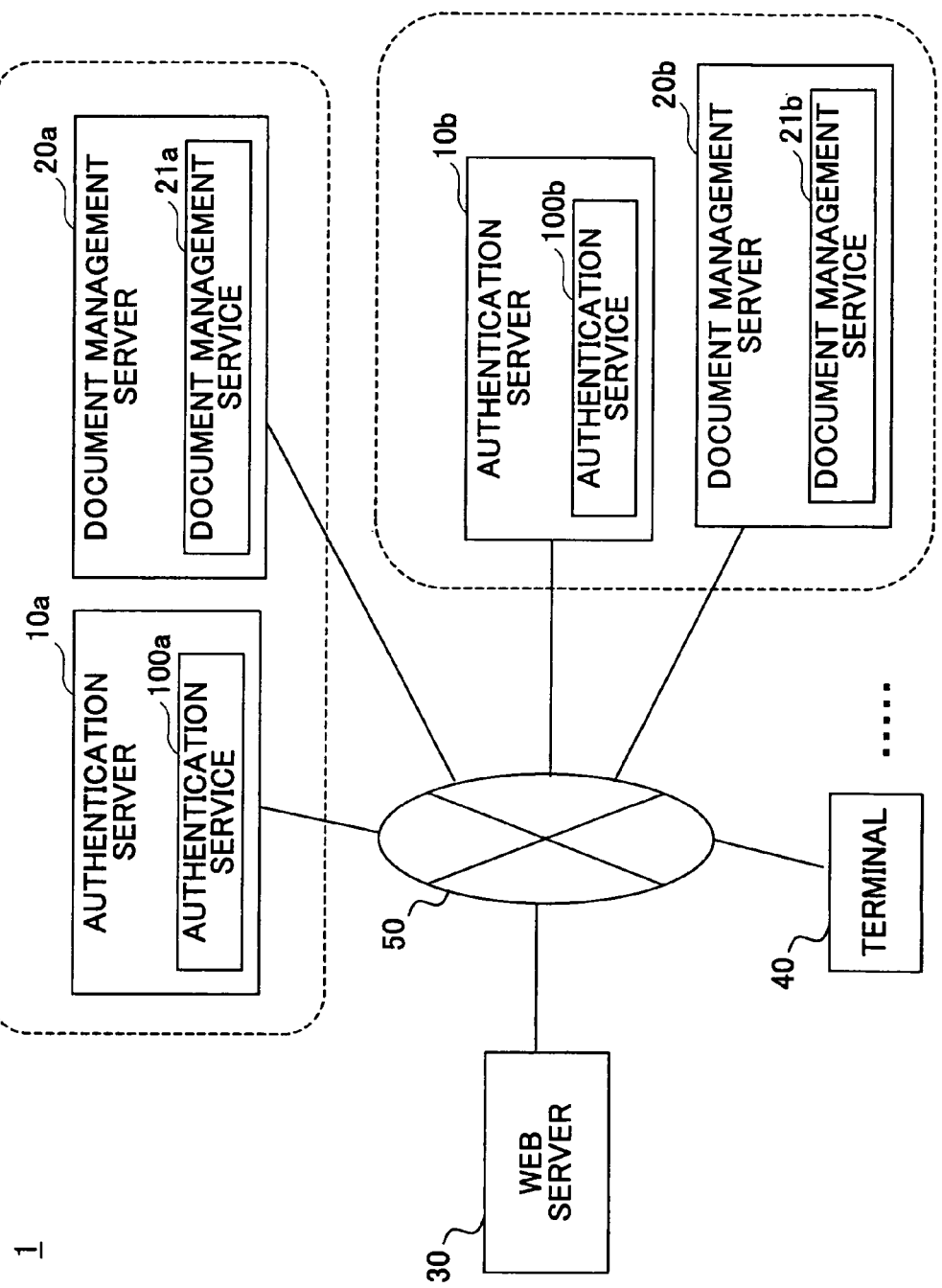
FIG. 3 is a drawing showing an example of the construction of a document management system according to an embodiment of the present invention.

FIG. 3 is a drawing showing an example of the construction of a document management system according to an embodiment of the present invention. As shown in FIG. 3, a document management system 1 according to the present embodiment includes authentication servers 10a and 10b (hereafter referred to as "authentication server 10" when making general reference), document management servers 20a and 20b (hereafter referred to as "document management server 20" when making general reference), a Web server 30, and at least one terminal 40. These elements are connected via a network 50 such as the Internet, a LAN, or the like.

The authentication server 10 is a computer having the functions (authentication services 100a and 100b which are referred to as "authentication service 100 when making general reference) implemented therein to authenticate users based on information for identifying users such as user names, passwords, domain names and the like (hereinafter referred to as "user identification information") and to provide user information. The authentication service 100 provides a user authentication function as a Web service on the network 50. In the present embodiment, the user information includes various information regarding users such as a ticket and user attribute information, which will be described later.

The document management server 20 is a computer having document information management functions (document management services 21*a* and 21*b* which are referred to as "document management service 21" when making general reference) implemented therein. The document management service 21 provides various functions such as the registration, search, and updating of document information as Web services on the network 50. A client using the functions of the document management server 20 needs to be authenticated by the authentication server 10. It should be noted here that the identity of the authentication server 10 matters. That is, the document management server 20 provides its functions to the clients who are authenticated by the authentication server 10 that the document management server 20 trusts. In this embodiment, the document management server 20*a* trusts the authentication server 10*a*, and the document management server 20*b* trusts the authentication server 10*b*. Accordingly, the clients using the document management server 20*a* need to be authenticated by the authentication server 10*a*, and the clients using the document management server 20*b* need to be authenticated by the authentication server 10*b*.

The Web server 30 is a computer having the function to provide to the terminal 40 a Web page for presenting information requested by the terminal 40. Here, the Web page refers to the data in HTML format, XML format, or the like that are displayable by generally-used Web browsers. The Web server 30 uses the function of the document management server 20 or the authentication server 10 or the like according to need when providing a Web page to the terminal 40.

The terminal 40 is a communication terminal such as a PC, PDA (personal digital(data) assistant), or a cellular phone that is provided with the Web browser for viewing a Web page provided by the Web server 30.

Figure 4:
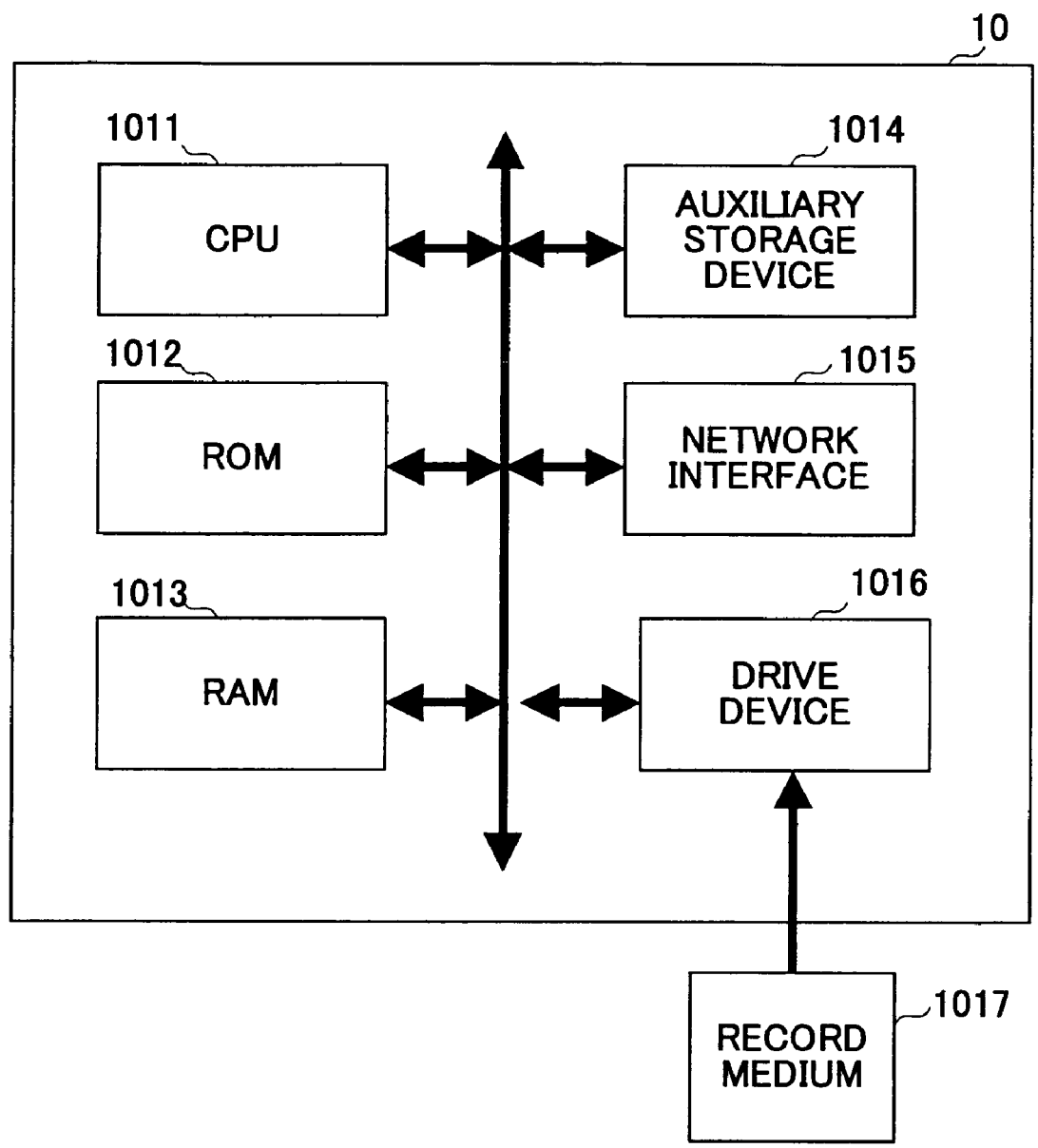
FIG. 4 is a drawing showing an example of the hardware construction of an authentication server according to the embodiment of the present invention.

In the following, a description will be given of the detail of the authentication server 10. FIG. 4 is a drawing showing an example of the hardware construction of the authentication server according to the embodiment of the present invention. The authentication server 10 includes a CPU 1011, a ROM 1012, a RAM 1013, an auxiliary storage device 1014, a network interface (I/F) 1015, and a drive device 1016.

The CPU 1011 serves as a control unit for attending to the overall control of the authentication server 10, and executes various control programs and application programs stored in the ROM 1012 or the auxiliary storage device 1014 to perform various operations such as device control, communication control, data acquisition, and data editing. The ROM 1012 is a memory means to store the device control programs mainly. The RAM 1013 is a memory means that is used as a work memory by the CPU 1011 and also serves as temporal data storage. The auxiliary storage device 1014 is a storage means that stores various application programs and data. The network I/F 1015 serves as an interface for connecting the authentication server 10 to the network 50. The drive device 1016 serves to read a record medium 1017 such as a CD-ROM on which the program for providing the functions of the present invention is recorded.

No operation unit and display unit is illustrated in FIG. 4. An operation unit such as a keyboard and mouse and a display unit such as a liquid display panel or a CRT may be provided to receive inputs from the user and to display the results of operation.

The document management server 20 and the Web server 30 may be implemented in the same manner by use of the configuration as shown in FIG. 4.

Figure 5:
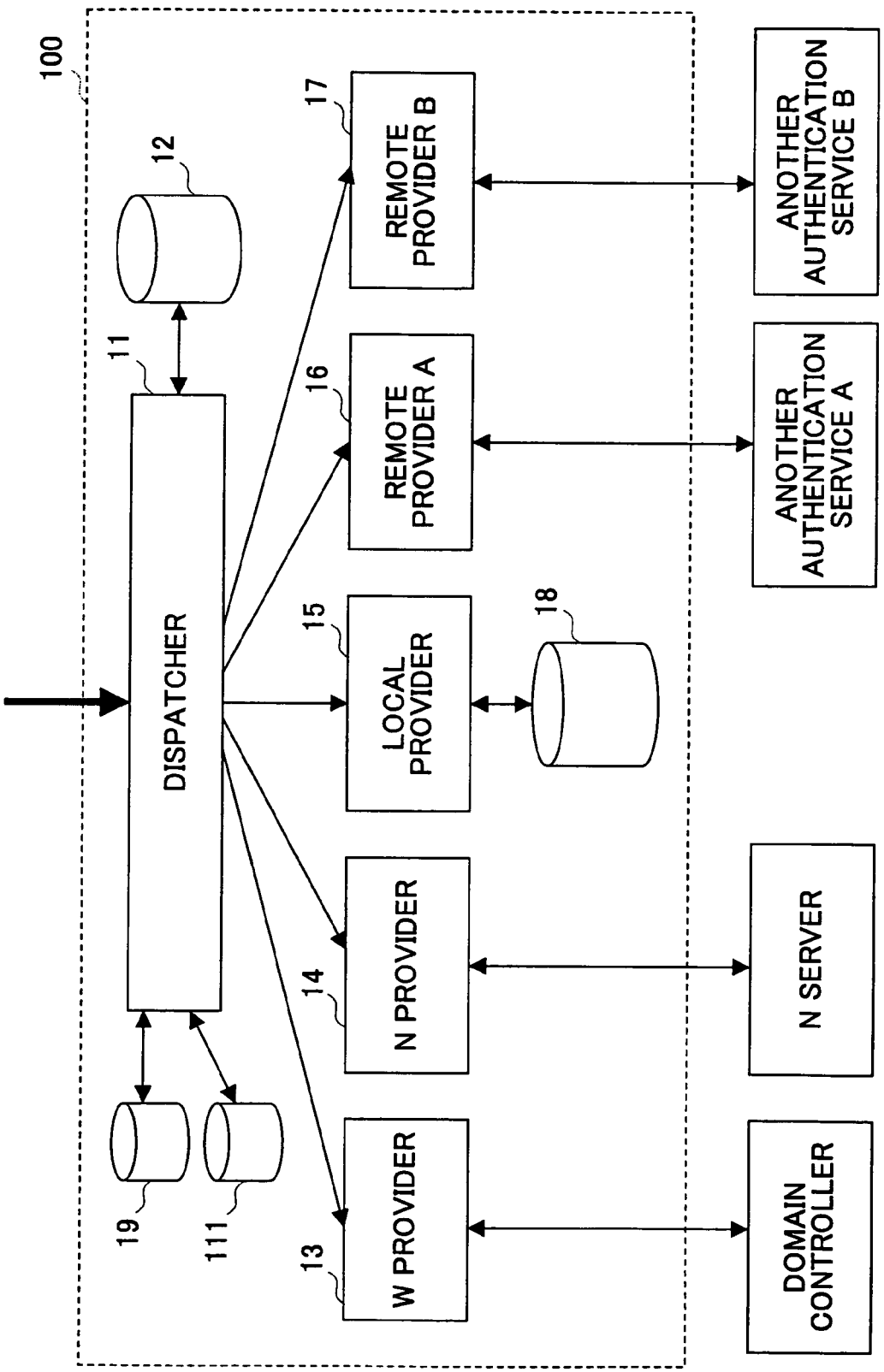
FIG. 5 is a drawing showing an example of the functional construction of an authentication service according to the embodiment of the present invention.

FIG. 5 is a drawing showing an example of the functional construction of the authentication service according to the embodiment of the present invention. As shown in FIG. 5, the authentication service 100 includes a dispatcher 11, a routing information managing table 12, a W provider 13, an N provider 14, a local provider 15, a remote provider A 16, a remote provider B 17, a local user DB (database) 18, a ticket managing table 19, and a confidential relation list 111.

The W provider 13, the N provider 14, the local provider 15, the remote provider A 16, and the remote provider B 17 (hereinafter referred to as an "authentication provider" when making general reference) are the modules for absorbing protocols unique to the respective authentication engines to provide the authentication function of the respective authentication engines through the unified interface. The provision of the unified interface by the authentication provider eliminates a need for the upper-order module (dispatcher 11) on the caller side for calling the authentication provider to recognize different protocols separately for different authentication engines. This provides an advantage in that the implementation of the upper-order module is simplified.

The W provider 13 is an authentication provider conforming to the password authentication by the domain controller of Windows (registered trademark). The N provider 14 is an authentication provider conforming to the password authentication by the Notes (registered trademark) server (illustrated as "N server" in the drawings).

The local provider 15 is an authentication provider having a unique authentication function implemented therein. Accordingly, the local provider 15 has its own local user DB 18, and attends to user authentication based on the information managed in the local user DB 18. The local user DB 18 serves to manage various attribute information regarding users (hereinafter referred to as "user attribute information") inclusive of the user names and passwords of the users belonging to the domain of the local provider 15.

The remote provider A 16 and the remote provider B 17 are authentication providers for delegating authentication tasks to other authentication servers 10. If the authentication server 10 of FIG. 5 is the authentication server 10*a*, for example, the remote provider A 16 serves as the authentication provider for delegating an authentication task to the authentication server 10*b*, and the remote provider B 17 servers as the authentication provider for delegating an authentication task to yet another authentication server 10 (not shown).

The dispatcher 11 is a module for calling the authentication providers described above individually. The routing information managing table 12 is used to manage information necessary for the dispatcher 11 to call the authentication providers individually. Upon receiving an authentication request from a client (the Web server 30 or the remote provider A 16 of another authentication server 10 in this embodiment), the dispatcher 11 refers to the routing information managing table 12 to determine the authentication provider corresponding to the authentication request, and calls this authentication provider.

The ticket managing table 19 is used to manage an electronic certificate (ticket) issued by the dispatcher 11 or the authentication provider that has authenticated the user at the time of user authentication.

A description of the confidential relation list 111 will be provided later.

In connection with FIG. 5, the description has been provided by treating the authentication services 100*a* and 100*b* as a unified service. In the following, however, the reference number of each constituent element is suffixed with "a" or "b" when discriminating the constituent elements of these authentication services.

As described above, the authentication providers correspond to the respective authentication engines. In this embodiment, therefore, a domain is formed separately for each of the authentication providers. Here, the domain refers to a single logical unit of coverage of user management, and is similar to the concept of a user domain or a domain. Within a single domain, the uniqueness of a user name is guaranteed.

In the following, a description will be given of the procedure of a process performed by the document management system of FIG. 3. The procedure of a process performed by the document management system will be described separately for a first embodiment and for a second embodiment. With respect to the first embodiment, a description will be given of a case in which the user uses the document management service 21*b* after using the document management service 21*a*. With respect to the second embodiment, a description will be given of a case in which the user uses the document management service 21*a* after using the document management service 21*b*, which is opposite to the case of the first embodiment.

Figure 6:
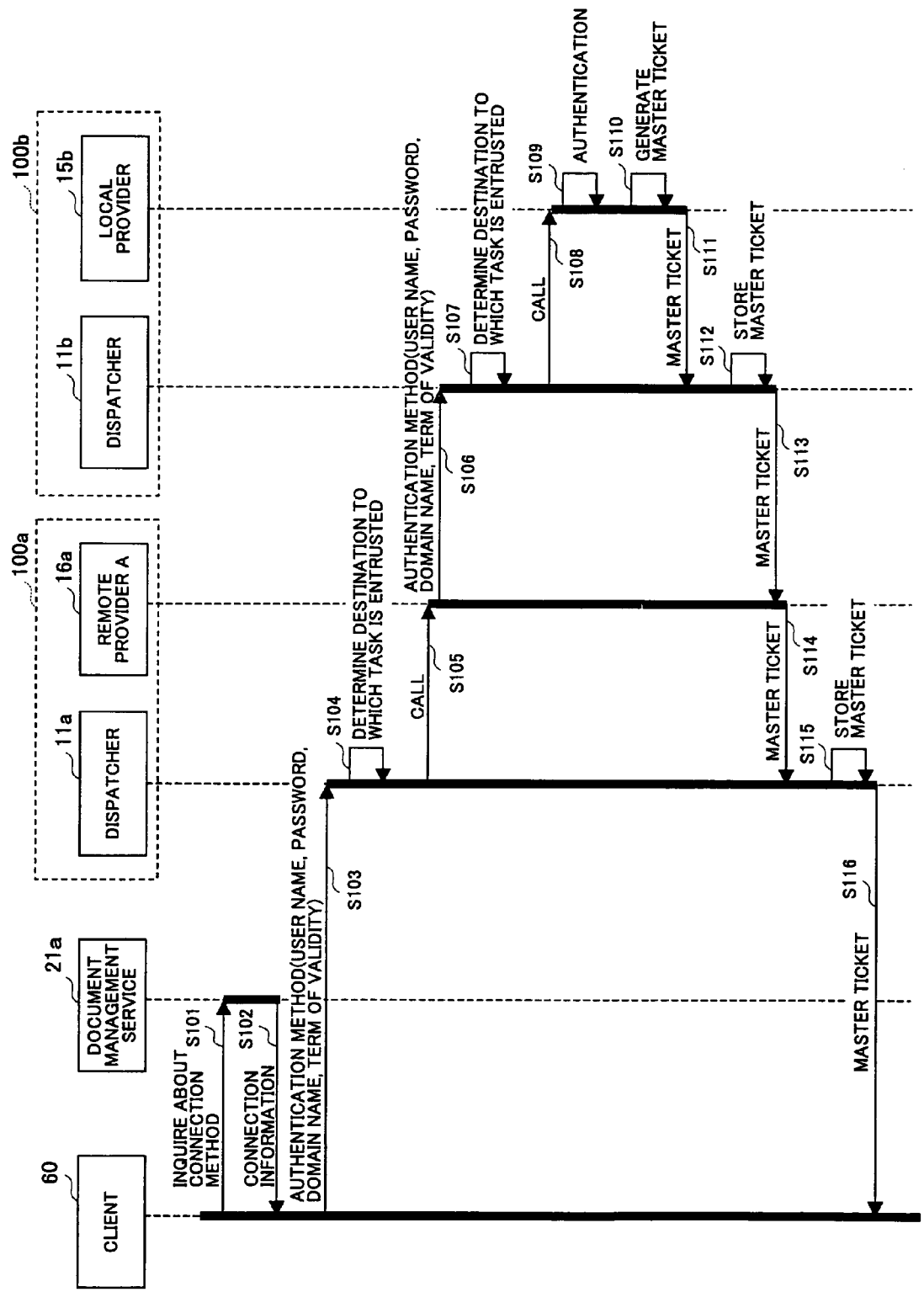
FIG. 6 is a sequence chart for explaining a process performed when a document management service is used in a first embodiment.
Figure 7:
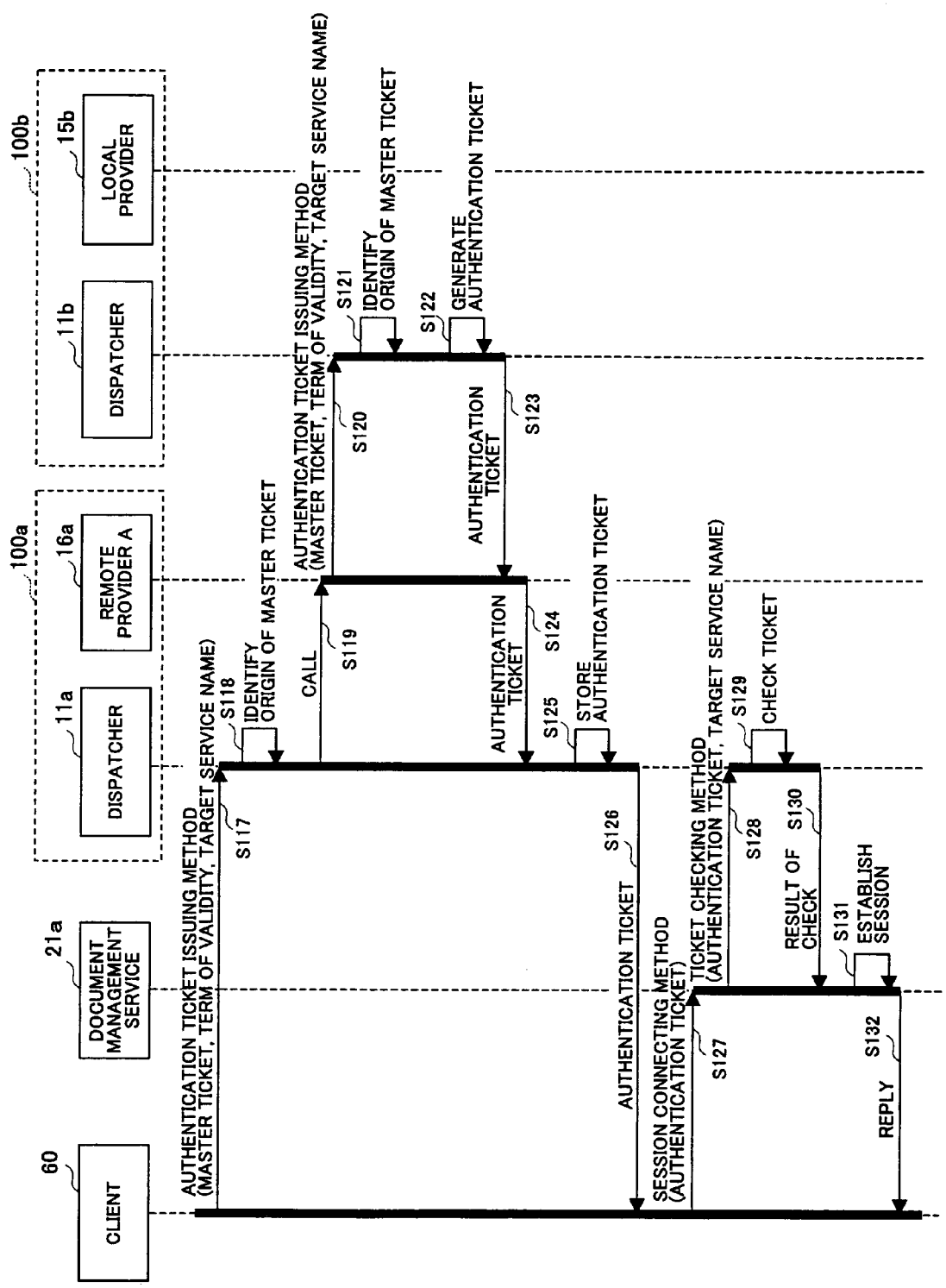
FIG. 7 is a sequence chart for explaining a process performed when the document management service is used in the first embodiment.

FIG. 6 and FIG. 7 are sequence charts for explaining the process performed when the document management service 21*a* is used in the first embodiment. With reference to FIG. 6, a description will be given of the process performed when a client 60 acquires a list of document information (hereinafter referred to as a "document list") that is managed by the document management service 21*a*. Here, the client 60 is an apparatus or software that uses the document management service 21, the authentication service 100, or the like, and may be the Web server 30 or the terminal 40, or the software operating on the Web server 30 or the terminal 40.

At step S101, the client 60 calls a method for inquiring connection information in the document management service 21*a* so as to request the transmission of information (connection information) necessary for using the document management service 21*a*.

Proceeding to step S102 following step S101, the document management service 21*a* transmits the connection information to the client 60 as a response to the method for inquiring connection information. The connection information transmitted here includes a name for uniquely identifying the document management service 21*a* (hereinafter referred to as a "target service name") and the URI of the authentication service 100*a* that the document management service 21*a* trusts (hereinafter referred to as a "target authentication service"). The authentication service 100*a* that the document management service 21*a* trusts is the authentication service 100 by which the user intending to use the service of the document management service 21*a* needs to be authenticated.

Proceeding to step S103 following step S102, the client 60 calls an authentication method of the authentication service 100*a* serving as a target authentication service by using the RPC of SOAP, thereby transmitting a request for user authentication (SOAP message) to the authentication service 100*a*.

FIG. 8 is a drawing showing an example of the SOAP message used at the time of calling an authentication method. In a SOAP message 61 shown in FIG. 8, the portion indicated by reference number 611 is the information for calling an authentication method. That is, the tag name "authenticateByPassword" of a tag 612 refers to the method name of the authentication method, and descriptions 613, 614, and 615 are the parameter information of the authentication method. In the description 613, the user name "aaa" is specified between <username> tags. In the description 614, the password "abc!" is specified between the <password> tags. In the description 615, the domain name "DomA" is specified between the <domainname> tags. In a description 616, further, a period of validity of the ticket is specified between <duration> tags. The user name, password, domain name, and the like specified as the parameters are entered by the user.

Proceeding to step S104 following step S103, the dispatcher 11*a* having received the SOAP message 61 refers to the routing information managing table 12 to determine the authentication provider to which the authentication task is to be entrusted.

FIG. 9 is a drawing showing an example of the construction of a routing information managing table in the authentication service 100*a*. As shown in FIG. 9, the routing information managing table 12*a* contains the provider name of the authentication provider corresponding to a domain with respect to each domain name. Based on the routing information managing table 12*a*, the dispatcher 11*a* determines the authentication provider corresponding to the domain name specified in the parameters of the authentication method, followed by calling this authentication provider (S105). In this embodiment, "DomA" is specified as a domain name, so that the dispatcher 11*a* calls the remote provider A 16*a* corresponding to the "DomA" domain.

Proceeding to step S106 following step S105, the remote provider A 16*a* calls the authentication method of the corresponding authentication service 100*b* by using the RPC of SOAP, thereby requesting user authentication to the authentication provider of the authentication service 100*b*. In the remote provider A 16*a*, the URI of the corresponding authentication service is specified in advance. Based on this specified URI, the remote provider A 16*a* identifies the authentication service 100 from which the authentication method is to be called. In this example, a SOAP message similar to the SOAP message 61 shown in FIG. 8 is transmitted from the remote provider A 16*a* to the authentication service 100*b*.

Proceeding to step S107 following step S106, the dispatcher 11*b* having received the SOAP message refers to the routing information managing table 12*b* in the authentication service 100*b* to determine the authentication provider to which the authentication task is to be entrusted.

FIG. 10 is a drawing showing an example of the construction of a routing information managing table in the authentication service 100*b*. As shown in FIG. 10, the routing information managing table 12*b* has the local provider registered as the authentication provider corresponding to the "DomA" domain. Namely, the "DomA" domain turns out to be the domain that is managed by the authentication service 100*b*. The dispatcher 11*b* thus calls the local provider 15*b* of the authentication service 100*b* as the authentication provider corresponding to the "DomA" domain (S108).

Proceeding to step S109 following step S108, the local provider 15*b* refers to the user names and passwords stored in the local user DB 18*b* to check whether the user name and password of the user requested the authentication are proper. If the user name and password are proper, the procedure goes to step S110, at which the local provider 15*b* generates a ticket indicative of successful authentication of the user.

The ticket will be described in the following. In this embodiment, two types of tickets, i.e., a master ticket and an authentication ticket, are defined. The master ticket is an electronic certificate certifying that the user is authenticated, i.e., the user is a legitimate user. The master ticket is issued by the authentication service 100 to the authenticated user. The authentication ticket, on the other hand, is the data that is required to be presented to a service (the document management service 21 in this embodiment) when this service is to be used. The authentication ticket is issued by the authentication service 100 for a limited range of services to which it can be used. Ultimately, the client intending to use a desired service needs to have the authentication ticket issued to the client. To this end, however, the client has to present a master ticket certifying the authenticity of the client. It is thus necessary to follow the procedure in which a master ticket is issued first, and an authentication ticket is issued next.

The reason why these two types of tickets are defined relates to security issues. The authentication ticket is limited in terms of the services to which it can be used. Even if the authentication ticket is stolen, thus, damage is limited within its range. On the other hand, the possession of a master ticket makes it possible to obtain authentication tickets for various services. If the master ticket is stolen, therefore, damage may spread to the entirety of the ticket-based system. The provision of authentication tickets allows such authentication tickets to be distributed for routine processing, thereby preventing the master tickets from being distributed with undesired frequency on the network.

FIG. 11 is a drawing showing an example of the data structure of a ticket. As shown in FIG. 11, a ticket includes a ticket ID, an effective range, the term of validity, an authenticated user ID, an MIC (message integrity code), etc.

The ticket ID is a code for uniquely identifying each ticket. The effective range indicates a ticket type as to whether it is a master ticket or an authentication ticket, and also indicates a range to which the ticket is usable if the ticket is an authentication ticket. That is, if the ticket is a master ticket, the effective range indicates "master". If the ticket is an authentication ticket, the effective range indicates the names (domain names, server names, etc.) for identifying the range to which the authentication ticket is usable.

The term of validity shows the period during which the ticket is valid. After the expiration of the term of validity, the ticket is regarded as invalid. This prevents damage from extending indefinitely even when the ticket is stolen. The term of validity of a master ticket refers to the period during which authentication tickets can be issued based on the master ticket. The term of validity of an authentication ticket refers to the period during which services can be used based on the authentication ticket.

The authenticated user ID is the user ID of the user who was authenticated. The MIC is a code for checking whether the ticket is tampered with after it is issued.

As previously described, it is the master ticket that is issued when the user is authenticated. Accordingly, a master ticket is generated at step silo.

Proceeding to step S111 following step S110, the local provider 15b sends the generated master ticket to the dispatcher 11b. In response, the dispatcher 11b registers the master ticket in the ticket managing table (S112).

FIG. 12 is a drawing showing an example of the construction of a ticket managing table in the authentication service 100b. As shown in FIG. 12, the ticket managing table 19b is used to manage a ticket, a ticket type, an issuing provider name, an issuing authentication server, ticket detailed information, etc., with respect to each issued ticket. The ticket is the substance of the ticket. The ticket type indicates whether the ticket is a master ticket or an authentication ticket. The issuing provider name indicates the name of the authentication provider that issued the ticket. The issuing authentication server is the information (e.g., machine name) for identifying the authentication server 10 that issued the ticket, and indicates "local" if the ticket is locally issued. The ticket detailed information is comprised of various information items regarding the user relating to the ticket. In FIG. 12, ticket C (the third record) is the master ticket that is registered in the ticket managing table 19b in step S112.

Proceeding to step S113 following step S112, the dispatcher 11b serializes and encrypts the master ticket, followed by transmitting a SOAP message inclusive of the encrypted master ticket to the remote provider A 16a of the authentication service 100a as a return value from the authentication method.

FIG. 13 is a drawing showing an example of the SOAP message inclusive of a return value from the authentication method. In a SOAP message 62 shown in FIG. 13, the portion indicated by reference number 621 is the return value. In the description 621, a character string indicated by reference number 622 between <returnValue> tags is the encrypted master ticket.

Proceeding to step S114 following step S113, the remote provider A 16a having received the SOAP message 62 decodes and de-serializes the master ticket included in the SOAP message 62, thereby outputting the de-serialized master ticket to the dispatcher 11a. Proceeding to step S115 following step S114, the dispatcher 11a registers the master ticket in the ticket managing table 19a in the authentication service 100a.

FIG. 14 is a drawing showing an example of the construction of the ticket managing table in the authentication service 100a. In the ticket managing table 19a of FIG. 14, ticket C is the master ticket that is registered at step S115. Strictly speaking, the provider that issued the ticket C is the local provider 15b of the authentication service 100b. In the ticket managing table 19a, however, the provider that issued the ticket C is recorded as "remote provider A". This is because the dispatcher 11a is not aware of the fact that the remote provider A 16a has entrusted an authentication task to the authentication service 100b. In the authentication service 100a, therefore, a ticket issued by the authentication service 100b is managed in the same manner as the ticket that is issued by the authentication service 100a.

Proceeding to step S116 following step S115, the dispatcher 11a transmits to the client 60 a SOAP message similar to the SOAP message 62 shown in FIG. 13 as a return value from the authentication method.

In the manner described above, the client 60 has successfully obtained a master ticket. In order to use the document management service 21a, there is a need to obtain an authentication ticket directed to the document management service 21a. Proceeding to step S117 (FIG. 7) following step S116, the client 60 calls a method for issuing an authentication ticket in the authentication service 100a that is the target authentication service by using the RPC of SOAP, thereby transmitting a request (SOAP message) for the issuance of an authentication ticket to the authentication service 100a.

FIG. 15 is a drawing showing an example of the SOAP message that is used at the time of calling a method for issuing an authentication ticket. In a SOAP message 63 shown in FIG. 15, the portion indicated by reference number 631 is the information for calling a method for issuing an authentication ticket. Namely, the tag name "createAuthTicket" of a tag 632 is the method name of the method for issuing an authentication ticket, and descriptions 633, 634, and 635 are the parameter information of the method for issuing an authentication ticket.

In the description 633, a serialized and encrypted master ticket is specified between the <masterAuthTicket> tags. In the description 634, the term of validity "60" of an authentication ticket requested for issuance is specified between the <duration> tags. In the description 635, further, the target service name "RepositoryA" serving as a valid range of an authentication ticket requested for issuance is specified as an item element between the <targets> tags. The target service name specified here is the target service name that was received as the name of the document management service 21a at step S102.

Proceeding to step S118 following step S117, the dispatcher 11a having received the SOAP message 63 checks whether the master ticket specified in the parameters of the method for issuing an authentication ticket is registered in the ticket managing table 19a (FIG. 14), thereby confirming that the master ticket is certainly issued by the authentication service 100a. Further, the dispatcher 11a refers to the ticket managing table 19a to check the issuing provider name registered with respect to the master ticket, thereby identifying the provider that has issued the master ticket.

Proceeding to step S119 following step S118, the dispatcher 11a requests the remote provider A 16a serving as the issuing provider to issue an authentication ticket. Proceeding to step S120 following step S119, the remote provider A 16a calls a method for issuing an authentication ticket of the corresponding authentication service 100b by using the RPC of SOAP, thereby requesting the issuance of an authentication ticket to the authentication service 100b. Here, a SOAP message similar to the SOAP message 63 described in connection with FIG. 15 is transmitted from the remote provider A 16a to the authentication service 100b.

Proceeding to step S121 following step S120, the dispatcher 11b having received the SOAP message checks whether the master ticket specified in the parameters of the method for issuing an authentication ticket is registered in the ticket managing table 19b (FIG. 12), thereby confirming that the master ticket is certainly issued by the authentication service 10b.

Furthermore, the dispatcher 11b refers to the ticket managing table 19b to check the issuing provider name registered with respect to the master ticket, thereby identifying the provider that has issued the master ticket. Here, the provider that has issued the master ticket is the local provider 15b, i.e., the authentication server that is local in the authentication service 100b (i.e., one that does not entrust a task to another authentication service 100).

Proceeding to step S122 following step S121, the dispatcher 11b generates an authentication ticket that has a valid range equal to the document management service 21a having its name specified as the target service name. The authentication ticket and the like are then registered in the ticket managing table 19b. The dispatcher 11b registers the ticket detailed information in the ticket managing table 19b after encrypting the information by using the target service name as an encryption key.

It should be noted that a check as to whether a given authentication provider is local or not may be made based on the name of the authentication provider. Alternatively, the check may be made by providing and referring to a table that indicates whether an authentication provider is local or not with respect to each authentication provider name.

Proceeding to step S123 following step S122, the dispatcher 11b serializes and encrypts the authentication ticket, followed by transmitting a SOAP message inclusive of the encrypted authentication ticket to the remote provider A 16a of the authentication service 100a as a return value responding to the calling of a method for issuing an authentication ticket.

FIG. 16 is a drawing showing an example of the SOAP message inclusive of a return value from a method for issuing an authentication ticket. In a SOAP message 64 shown in FIG. 16, the portion indicated by reference number 641 is the return value. In a description 642, a character string placed between the <returnvalue> tags is the encrypted authentication ticket.

Proceeding to step S125 following step S124, the dispatcher 11a registers the received authentication ticket in the ticket managing table 19a of the authentication service 100a. Proceeding to step S126 following step S125, the dispatcher 11a transmits to the client 60 a SOAP message similar to the SOAP message 64 shown in FIG. 16 as a return value from the method for issuing an authentication ticket.

In the manner as described above, the client 60 has successfully obtained an authentication ticket directed to the document management service 21a in order to use the document management service 21a. Proceeding to step S127 following step S126, the client 60 calls a method for connecting a session in the document management service 21a by using the RPC of SOAP, thereby requesting session connection to the document management service 21a. Here, the authentication ticket is specified in the parameters of the method for connecting a session.

Proceeding to step S128 following step S127, the document management service 21a calls a method for checking a ticket in the authentication service 100a in order to check the authenticity of the authentication ticket specified in the parameters of the method for connecting a session, which is called by the client 60. The parameters of the method for checking a ticket include the authentication ticket and the name of the document management service 21a that serves as the target service name.

Proceeding to step S129 following step S128, the dispatcher 11a of the authentication service 100a checks the authenticity of the authentication ticket. Specifically, the dispatcher 11a checks based on the ticket managing table 19a whether the authentication ticket exists, and also checks the term of validity of the authentication ticket. Further, the dispatcher 11a attempts to decode the ticket detailed information by using as a decoding key the target service name specified in the parameters of the method for checking a ticket. At the time the authentication ticket was issued (S122), the ticket detailed information was encrypted by use of the target service name specified as the valid range of the authentication ticket. If the ticket detailed information is successfully decoded by using as a decoding key the target service name specified in the parameters of the method for checking a ticket, the sameness of these two target service names is confirmed. This guarantees that the authentication ticket is certainly one that has been issued with respect to (as having the valid range of) the document management service 21a.

Proceeding to step S130 following step S129, the dispatcher 11a transmits the result of the check of the authentication ticket to the document management service 21a as a return value from the method for checking a ticket. Proceeding to step S131 following step S130, the document management service 21a establishes a session with the client 60 based on the finding of the authenticity of the client 60 if the return value from the method for checking a ticket indicates the authenticity of the authentication ticket. Proceeding to step S132 following step S131, the document management service 21a replies to the client 60 about the permission/refusal of a session connection. If the connecting of a session is permitted, for example, a session ID or the like for identifying the session is transmitted to the client 60.

Thereafter, the client 60 requests the document management service 21a to provide a document list or the like through the established session.

In the manner as described above, the authentication server 10 according to the present embodiment is capable of entrusting another authentication server 10 with an authentication request relating to a user outside its management. Collaboration between the authentication services 100 is thus achieved, and clients can use services in an integrated environment without being conscious of the distributed management.

The present invention is applicable to other processes in addition to the authentication process. When each apparatus is an information management apparatus for managing predetermined information, for example, a search request issued to one information management apparatus may be entrusted to another information management apparatus. This provides for the plurality of information management apparatus to be integrated.

Figure 17:
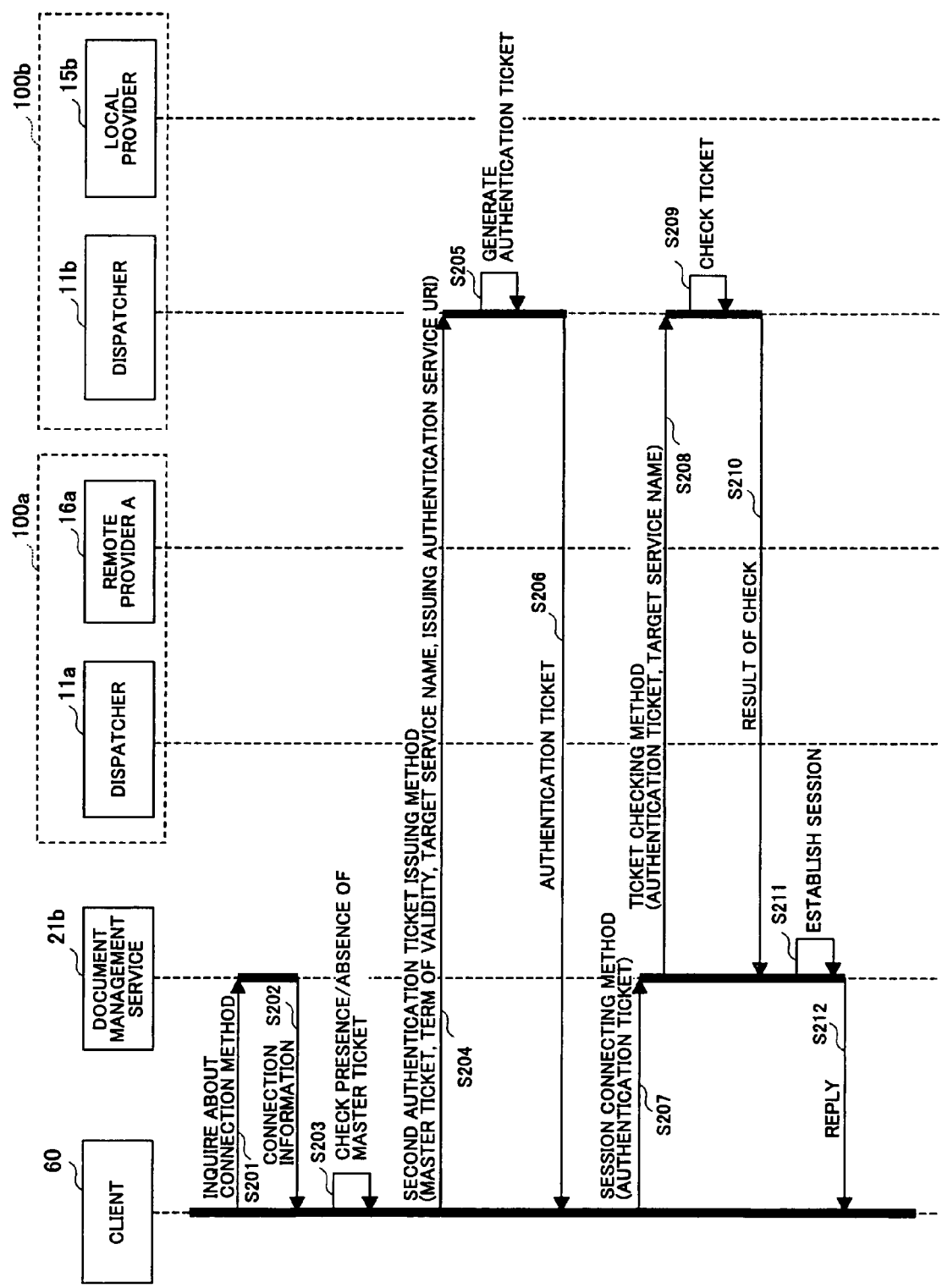
FIG. 17 is a sequence chart for explaining a process performed when the document management service is used according to the first embodiment.

In the following, a description will be given of a case in which the user having been using the function of the document management service 21a attempts to use the function of the document management service 21b. FIG. 17 is a sequence chart for explaining the process performed when the document management service 21b is used according to the first embodiment.

Steps S201 and S202 are defined in the same manner as steps S101 and S102 previously described. That is, the client 60 calls a method for inquiring connection information in the document management service 21b so as to obtain the connection information from the document management service 21b. The connection information includes a name for uniquely identifying the document management service 21b ("target service name") and the URI of the authentication service 100b that the document management service 21b trusts ("target authentication service").

Proceeding to step S203 following step S202, the client 60 checks whether a master ticket directed to the current user issued by any authentication service 100 is in its possession. In this example, the master ticket issued (S116 in FIG. 6) by the authentication service 100a for the use of the document management service 21a is in its possession. The client 60 thus finds that such a master ticket is in its possession.

Proceeding to step S204 following step S203, the client 60 calls a second method for issuing an authentication ticket in the authentication service 100b serving as the target authentication service by using the RPC of SOAP based on the master ticket that is held in its possession. That is, a request (SOAP message) for an authentication ticket is transmitted to the authentication service 100b. If no master ticket is in its possession, the client 60 requests the use to enter the user name and password or the like, and calls an authentication method in the authentication service 100b by using the entered user name and password or the like as parameters in the same manner as in step S103 of FIG. 6. Namely, the check of the presence/absence of a master ticket at step S203 is also performed prior to step S103 in FIG. 6, but was omitted in FIG. 6 for the sake of convenience.

FIG. 18 is a drawing showing an example of the SOAP message used at the time of calling the second method for issuing an authentication ticket. In a SOAP message 65 shown in FIG. 18, the portion indicated by reference number 651 is the information for calling the second method for issuing an authentication ticket. Namely, the tag name "createAuthTicketBySSO (Single Sign On)" of a tag 652 is the method name of the second method for issuing an authentication ticket, and descriptions 653, 654, 655, and 656 are the parameter information of the second method for issuing an authentication ticket.

The descriptions 653, 654, and 655 are the same as the descriptions 633, 634, and 635 of the SOAP message 63 used at the time of calling the method for issuing an authentication ticket (createAuthTicket), and a description thereof will be omitted. In the description 656, the URI of the authentication service 100 that has issued the master ticket (description 653) specified as one of the parameters is specified between the <ua_uri> tags. The master ticket appears to the client 60 as if it had been issued from the authentication service 100a. In this example, therefore, the specified URI is that of the authentication service 100a.

It should be noted that the master ticket specified in one of the parameters of the second method for issuing an authentication ticket as viewed from the client 60 appears to be issued by the authentication service 100a different from the authentication service 100b to which a request for issuing an authentication ticket is directed. In the case of a method for issuing an authentication ticket, the specified master ticket needs to be the one that has been issued by the authentication service 100 in which this method is called (see S117 in FIG. 7). This is because a master ticket is valid only with respect to the authentication service 100 that has issued the master ticket. In the second method for issuing an authentication ticket, however, a master ticket that has been issued by another authentication service 100 as viewed from the client 60 can be specified in order to make an attempt to see whether an authentication ticket can be issued by use of the master ticket.

Figure 19:
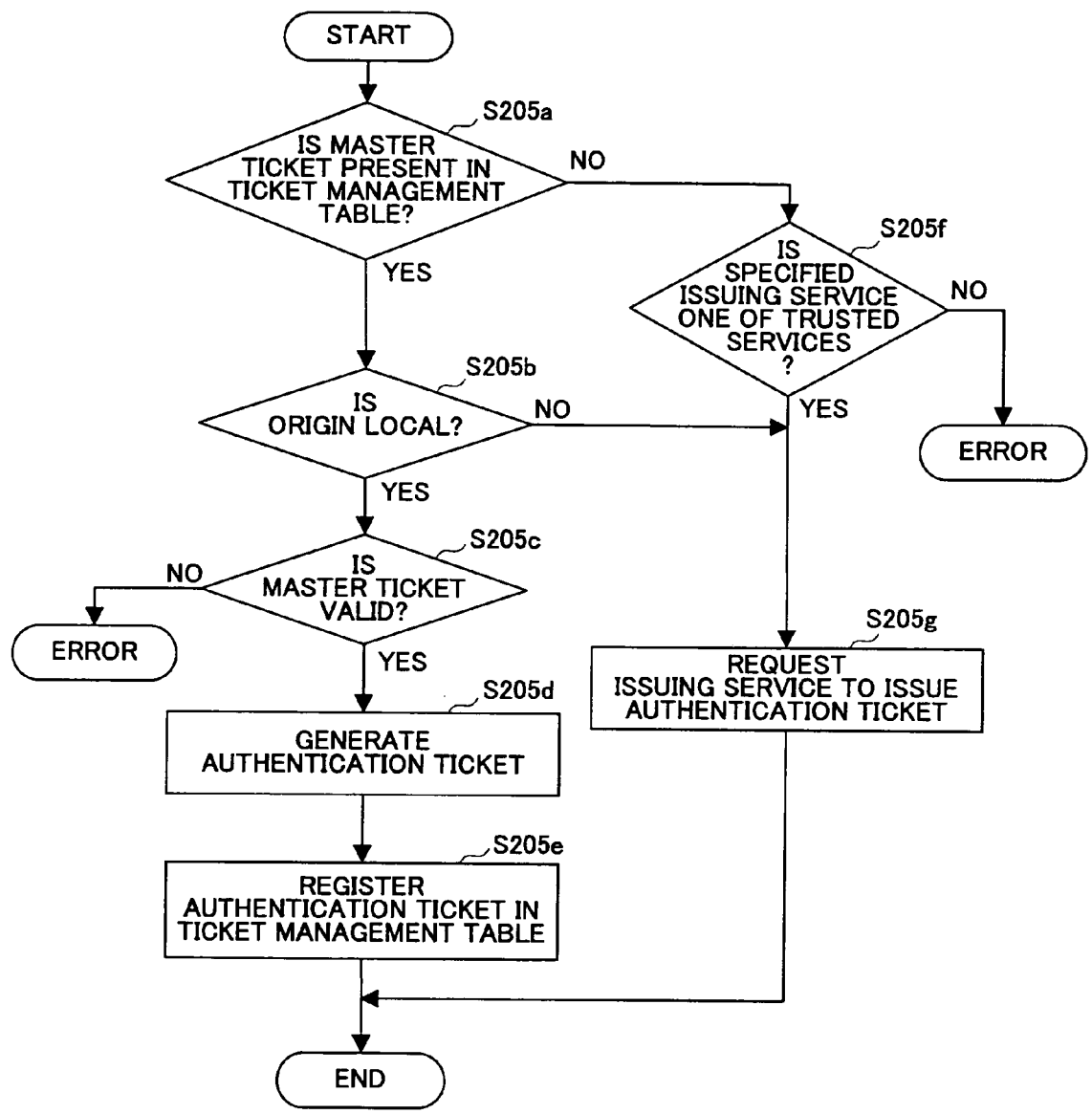
FIG. 19 is a flowchart for explaining an authentication ticket generating process performed when the second method for issuing an authentication ticket is called.

Proceeding to step S205 following step S204, the dispatcher 11b having received the SOAP message performs a process for generating an authentication ticket (authentication ticket generating process). The detail of the authentication ticket generating process will be described by use of a flowchart. FIG. 19 is a flowchart for explaining the authentication ticket generating process performed when the second method for issuing an authentication ticket is called.

The dispatcher 11b checks whether the master ticket specified in the parameters of the second method for issuing an authentication ticket is registered in the ticket managing table 19b (FIG. 12) (S205a). Here, the master ticket specified in the parameters of the second method for issuing an authentication ticket appears to the client 60 as if it had been issued by the authentication service 100a. In reality, however, it was issued (S110) in FIG. 6) by the local provider 15b of the authentication service 10b, which was entrusted by the authentication service 100a. The master ticket generated in such a manner is registered as "ticket C" in the ticket managing table 19b.

Proceeding to step S205b following step S205a, the dispatcher 11b refers to the ticket managing table 19b to check whether the issuing authentication server of the master ticket (ticket C in this example) is "local", i.e., whether the origin of the master ticket is local (i.e., issued by the authentication service 100b). If the origin of the master ticket is local, the procedure goes to step S205c, at which the dispatcher 11b checks the term of validity of the master ticket. If the term of validity of the master ticket has not expired, the dispatcher 11b generates an authentication ticket (S205d) with a valid range equal to the document management service 21b having its name specified as the target service name. The dispatcher 11b then registers the authentication ticket and the like in the ticket managing table 19b (s205e). As for the ticket detailed information, the information encrypted by using the target service name as an encryption key is registered in the ticket managing table 19*b* in the same manner as in step S122 (FIG. 7).

If the term of validity of the master ticket has already expired (No at step S205*c*), the authentication ticket generating process comes to an abnormal halt. If the master ticket is registered in the ticket managing table 19*b* but the origin is not local (not the authentication service 100*b*) (No at step S205*b*), the dispatcher 11*b* requests the issuing authentication service 100 to issue an authentication ticket (S205*g*). The case in which the master ticket is not registered in the ticket managing table 19*b* (No at step S205*a*) will be described later.

With reference to FIG. 17 again, proceeding to step S206 following step S205, the dispatcher 11*b* serialize and encrypts the generated authentication ticket, and transmits to the client 60 a SOAP message inclusive of the encrypted authentication ticket as a return value responding to the calling of the second method for issuing an authentication ticket.

FIG. 20 is a drawing showing an example of the SOAP message inclusive of a return value from the second method for issuing an authentication ticket. The contents of a SOAP message 66 shown in FIG. 20 are almost the same as the contents of the SOAP message 64 of FIG. 16, and a description thereof will be omitted.

In the manner described above, the client 60 has successfully obtained an authentication ticket directed to the document management service 21*b* in order to use the document management service 21*b*. Thereafter, the client 60 establishes a session with the document management service 21*b* by use of the authentication ticket (S207 through S212) as was described in connection with steps S127 through S132 (FIG. 7), thereby making it possible to use the function of the document management service 21*b*.

With the authentication server 10 of the first embodiment as described above, the client 60 successfully obtains an authentication ticket directed to the document management server 20*b* by using the master ticket issued at the time of using the document management server 20*a*. Namely, the client 60 does not need to obtain another master ticket issued by the authentication server 10*b* when using the document management server 20*b*. This eliminates the trouble of obtaining a new master ticket issued by another authentication server 10 each time the document management servers 20 used by the client 60 are switched. Further, the user is freed from the trouble of entering the user name and password or the like each time the document management servers 20 are switched. The authentication process required at the time of using a plurality of services is thus made more efficient.

In the following, a description will be given of the second embodiment, i.e., the case in which the user uses the document management service 21*a* after using the document management service 21*b* with the same user identification information, i.e., the same user name, password, and domain name, as that used in the first embodiment. The first embodiment is an example in which the first authentication request is entrusted from the authentication service 100*a* to the authentication service 10*b*. In the second embodiment, on the other hand, the first authentication request is handled by the authentication service 100*b* that originally received the authentication request. The second embodiment is intended to highlight changes that are brought about in the flow of processes due to the difference from the first embodiment. A description of such changes will be given in the following with reference to sequence charts.

Figure 21:
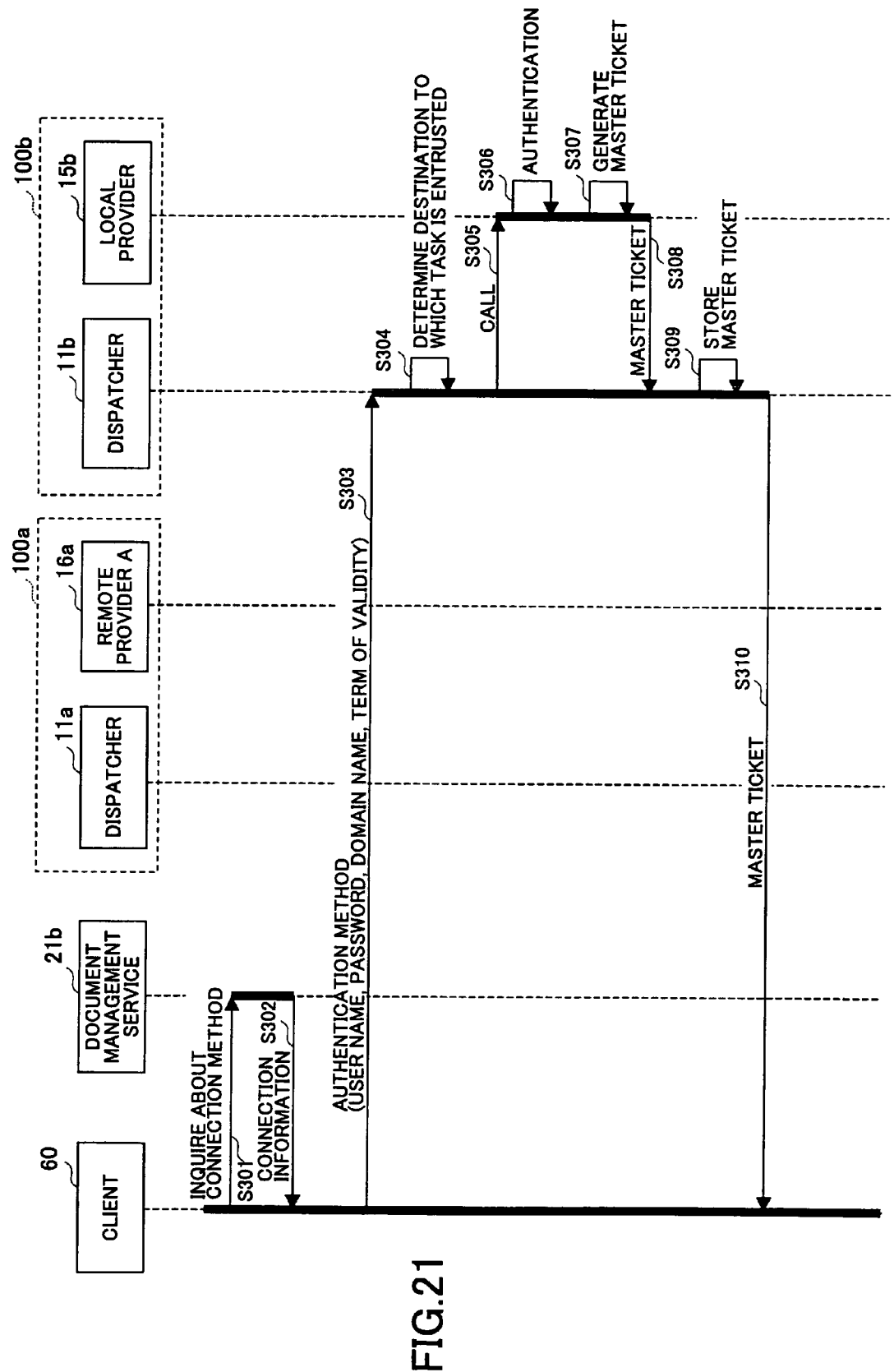
FIG. 21 is a sequence chart for explaining a process performed at the time of using the document management service in the second embodiment.
Figure 22:
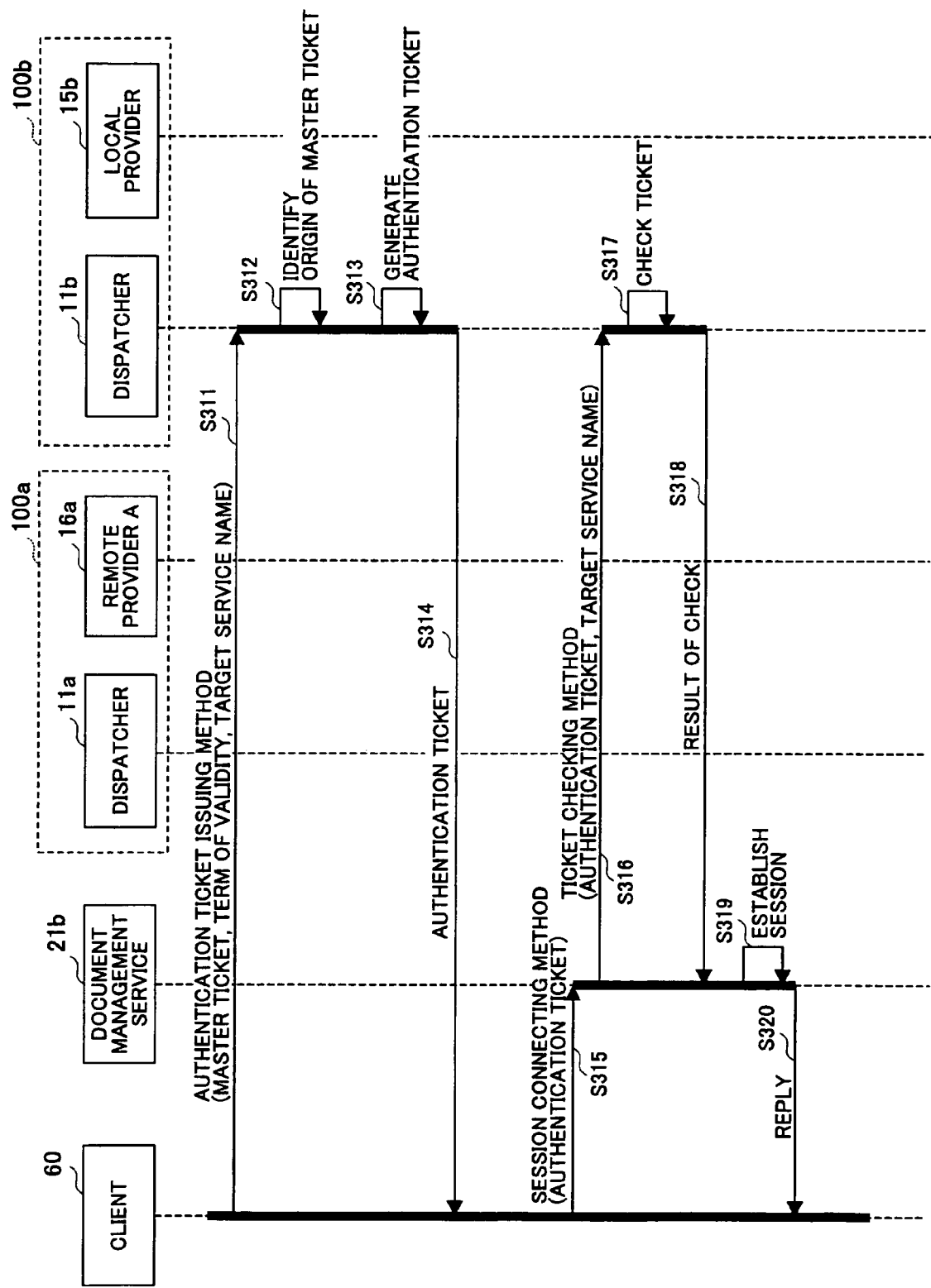
FIG. 22 is a sequence chart for explaining a process performed at the time of using the document management service in the second embodiment.

FIG. 21 and FIG. 22 are sequence charts for explaining the process performed at the time of using the document management service 21*b* in the second embodiment. With reference FIG. 21, a description will be given of a case in which the client 60 obtains a document list managed by the document management service 21*b*. In the initial conditions shown in FIG. 21, the current user has not been authenticated by any authentication service 100, i.e., has not yet received any master ticket.

At step S301 and step S302, the client 60 calls a method for inquiring connection information in the document management service 21*b*, thereby obtaining the connection information from the document management service 21*b*. The connection information includes a name for uniquely identifying the document management service 21*b* ("target service name") and the URI of the authentication service 100*b* that the document management service 21*b* trusts ("target authentication service").

Proceeding to step S303 following step S302, the client 60 calls an authentication method of the authentication service 100*b* serving as the target authentication service by using the RPC of SOAP, thereby transmitting a request for user authentication (SOAP message) to the authentication service 100*b*.

Proceeding to step S304 following step S303, the dispatcher 11*b* having received the SOAP message refers to the routing information managing table 12*b* (FIG. 10) in the authentication service 100*b* to determine an authentication provider to which the authentication process is to be requested. Since the same domain name as in the first embodiment is specified in this case, the local provider 15*b* is called (S305). Accordingly, the authenticating of the user and the generating of a master ticket are performed at steps S306 through S309 in the same manner as in steps S109 through S112 (FIG. 6), and the generated master ticket is registered in the ticket managing table 19*b*. Proceeding to step S310 following step S309, the dispatcher 11*b* transmits to the client 60 a SOAP message inclusive of the generated master ticket as a return value from the authentication method.

After this, the client 60 performs a process for obtaining an authentication ticket directed to the document management service 21*b*. Proceeding to step S311 following step S310, the client 60 calls a method for issuing an authentication ticket in the authentication service 100*b* serving as the target authentication service by using the RPC of SOAP, thereby transmitting a request (SOAP message) for the issuance of an authentication ticket to the authentication service 100*b*.

Having received the SOAP message, the dispatcher 11*b* performs the process for generating an authentication ticket (S312, S313) in the same manner as in steps S121 and S122 (FIG. 7). The generated authentication ticket is transmitted from the dispatcher 11*b* to the client 60 (S314).

In the manner as described above, the client 60 has successfully obtained an authentication ticket directed to the document management service 21*b* in order to use the document management service 21*b*. Thereafter, the client 60 establishes a session with the document management service 21*b* by use of the authentication ticket (S315 through S316) as was described in connection with steps S127 through S132 (FIG. 7), thereby making it possible to use the function of the document management service 21*b*.

Figure 23:
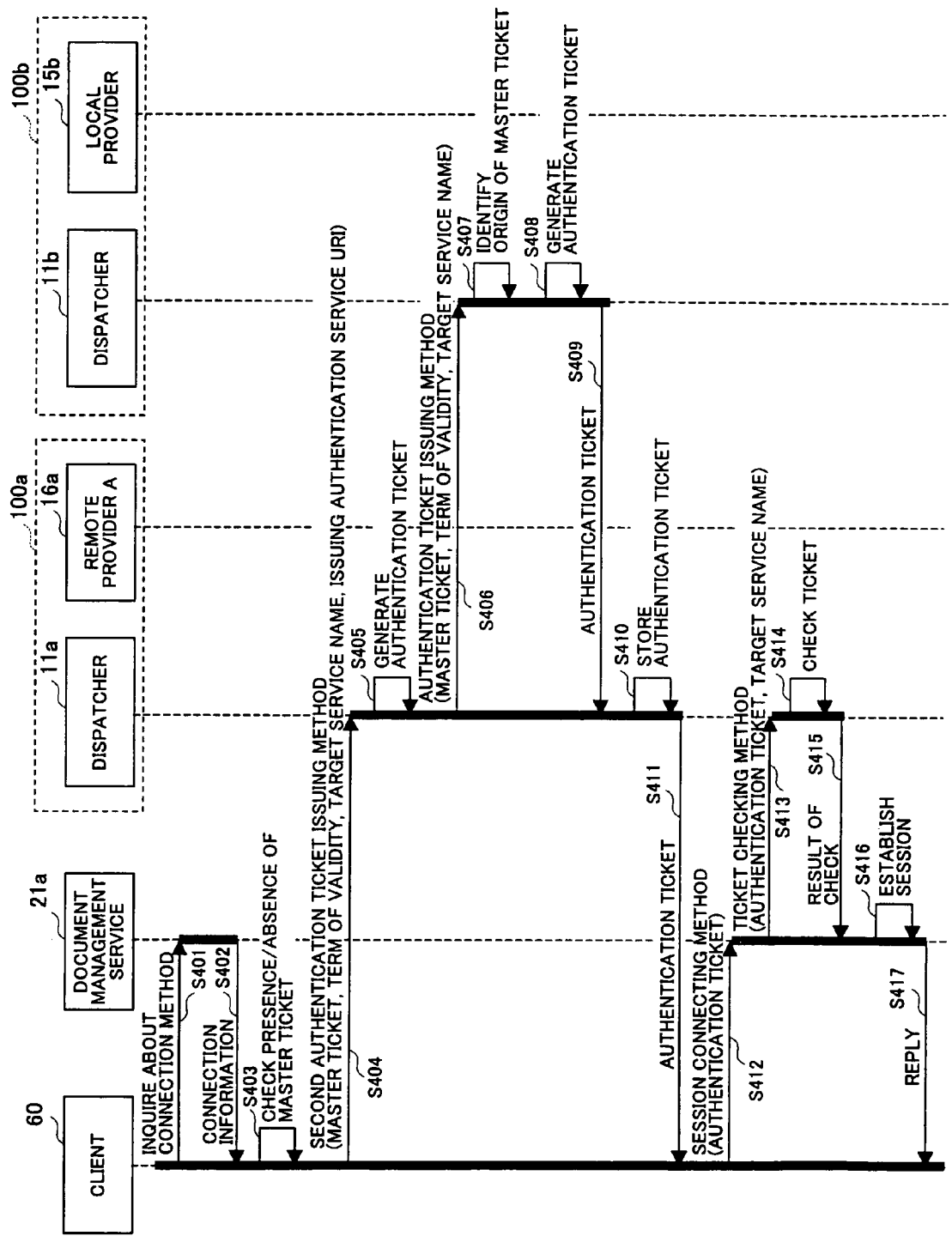
FIG. 23 is a sequence chart for explaining a process performed when the document management service is used in the second embodiment.

In the following, a description will be given of a case in which the user having been using the function of the document management service 21*b* attempts to use the function of the document management service 21*a*. FIG. 23 is a sequence chart for explaining the process performed when the document management service 21*a* is used in the second embodiment.

At steps S401 and S402, the client 60 calls a method for inquiring connection information in the document management service 21*a* so as to obtain the connection information from the document management service 21a. The connection information includes a name for uniquely identifying the document management service 21a ("target service name") and the URI of the authentication service 100a that the document management service 21a trusts ("target authentication service").

Proceeding to step S403 following step S402, the client 60 checks whether a master ticket directed to the current user issued by any authentication service 100 is in its possession. In this example, the master ticket issued (S310 in FIG. 21) by the authentication service 100b for the use of the document management service 21b is in its possession. The client 60 thus finds that such a master ticket is in its possession.

Proceeding to step S404 following step S403, the client 60 calls a second method for issuing an authentication ticket (createAuthTicketBySSO) in the authentication service 100a serving as the target authentication service by using the RPC of SOAP based on the master ticket that is held in its possession. That is, a request (SOAP message in FIG. 18) for the issuance of an authentication ticket is transmitted to the authentication service 100b. If no master ticket is in its possession, the client 60 requests the use to enter the user name and password or the like, and calls an authentication method in the authentication service 100a by using the entered user name and password or the like as parameters in the same manner as in step S303 of FIG. 21. Namely, the check of the presence/absence of a master ticket at step S403 is also performed prior to step S303 in FIG. 21, but was omitted in FIG. 21 for the sake of convenience.

It should be noted that, as in the case of step S205 (FIG. 17), the master ticket specified in the parameters of the second method for issuing an authentication ticket as viewed from the client 60 appears to have been issued by the authentication service 100b different from the authentication service 100a to which the request for the issuance of an authentication ticket is directed.

Proceeding to step S405 following step S404, the dispatcher 11a having received the SOAP message performs an authentication ticket generating process (FIG. 19). In this case, however, the master ticket is not registered in the ticket managing table 19a. This is because the processes shown in FIG. 21 and FIG. 22 performed so far do not include a process for registering a master ticket in the ticket managing table 19a. At step S205a of FIG. 19, thus, the dispatcher 11a ascertains that a master ticket does not exist, and proceeds to step S205f.

At step S205f, the dispatcher 11a checks whether the confidential relation list 111 includes the URI of the authentication service that has issued the master ticket as specified in the parameters of the second method for issuing an authentication ticket.

Figure 24:
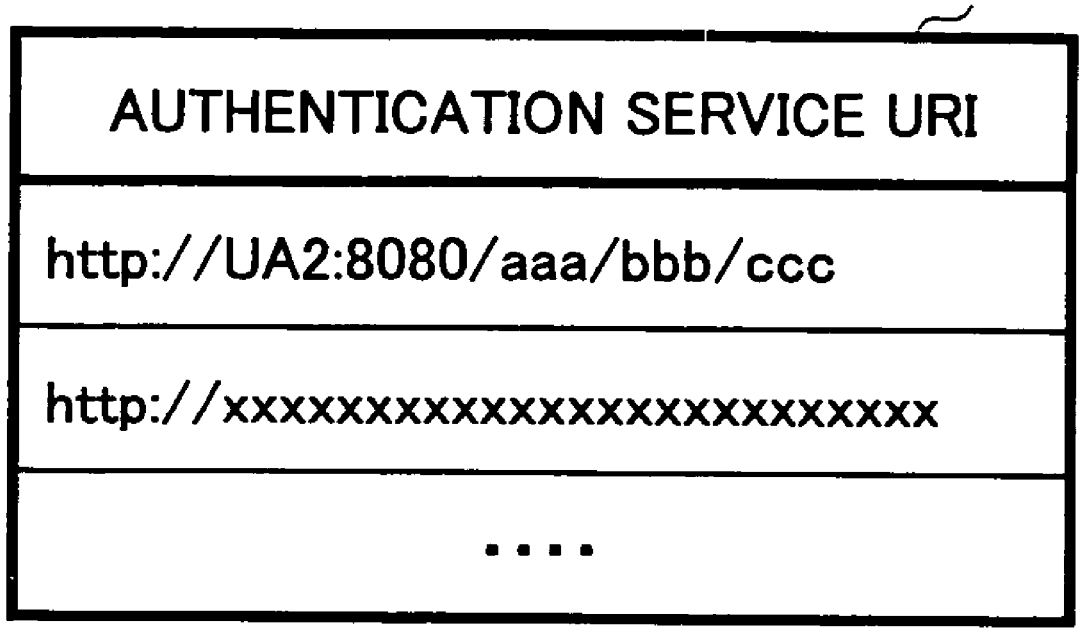
FIG. 24 is a drawing showing an example of a confidential relation list.

FIG. 24 is a drawing showing an example of the confidential relation list. The confidential relation list 111 of FIG. 24 has a registered list of the URIs of other authentication services 100 that the authentication service 100a trusts. Here, the terminology "trust" is used to refer to the relation in which no security risk is perceived in entrusting the issuance of master tickets and authentication tickets in the responsibility of the administrator. Subjectively, therefore, the confidential relation list 111 includes a registered list of the URIs of the authentication services 100 to which a master ticket can be entrusted.

If the URI of the authentication service 100b that has issued the master ticket is registered in the confidential relation list ill, the dispatcher 11a calls a method for issuing an authentication ticket in the authentication service 100b by using the RPC of SOAP, thereby requesting the issuance of an authentication ticket to the authentication service 100b (S205g). If the URI of the authentication service 100b is not registered in the confidential relation list 111, it is not possible to entrust the task of issuing an authentication ticket to the authentication service 100b specified as the origin of the master ticket. The authentication ticket generating process thus comes to an abnormal halt.

With reference to FIG. 23 again, step S406 of FIG. 23 is equivalent to step S205g described in connection with FIG. 19. Proceeding to step S407 following step S406, the dispatcher 11b having received the SOAP message performs the authentication ticket generating process (S408) in the same manner as in steps S312 and S313 (FIG. 22), and transmits the generated authentication ticket to the client 60 (S409).

Proceeding to step S410 following step S409, the dispatcher 11a registers the received authentication ticket in the ticket managing table 19a. Proceeding to step S412 following step S411, the dispatcher 11a transmits to the client 60 a SOAP message inclusive of the authentication ticket as a return value from the second method for issuing an authentication ticket.

In the manner described above, the client 60 has successfully obtained an authentication ticket directed to the document management service 21a in order to use the document management service 21a. Thereafter, the client 60 establishes a session with the document management service 21a by use of the authentication ticket (S412 through S417) as was described in connection with steps S127 through S132 (FIG. 7), thereby making it possible to use the function of the document management service 21a.

With the authentication server 10 of the second embodiment as described above, the client 60 successfully obtains an authentication ticket directed to the document management server 20a by using the master ticket issued at the time of using the document management server 20b. Namely, the client 60 does not need to obtain another master ticket issued by the authentication server 10a when using the document management server 20a. This eliminates the trouble of obtaining a new master ticket issued by another authentication server 10 each time the document management servers 20 used by the client 60 are switched. Further, the user is freed from the trouble of entering the user name and password or the like each time the document management servers 20 are switched. The authentication process required at the time of using a plurality of services is thus made more efficient.

It should be noted that the collaboration of the authentication servers 10 (entrusting of an authentication task) does not result in a compromise on security. The collaboration of the authentication servers 10 is attended to under the responsibility of the system administrators. It can thus be said that trust is present between the authentication servers 10. Such trust is believed to be the underpinning of sustained security.

The present embodiment has been described with reference to an example in which the user name and password or the like are used as user identification information. This is not intended to limit the user identification information to such an example. Together with the development of the authentication technology, various authentication methods such as fingerprint authentication and card authentication are employed these days. The user identification information may be replaced by other information that is suitable to such authentication methods.

Nowadays CPUs are implemented in built-in devices dedicated to particular functions, and provide these functions by utilizing software in the same manner as do the computers. An example of such device is an image forming apparatus having the applications of a printer, a copier, a facsimile device, and the like, which is referred to as a multifunction peripheral. Due to security consideration, such device may. also need authentication functions.

Figure 25:
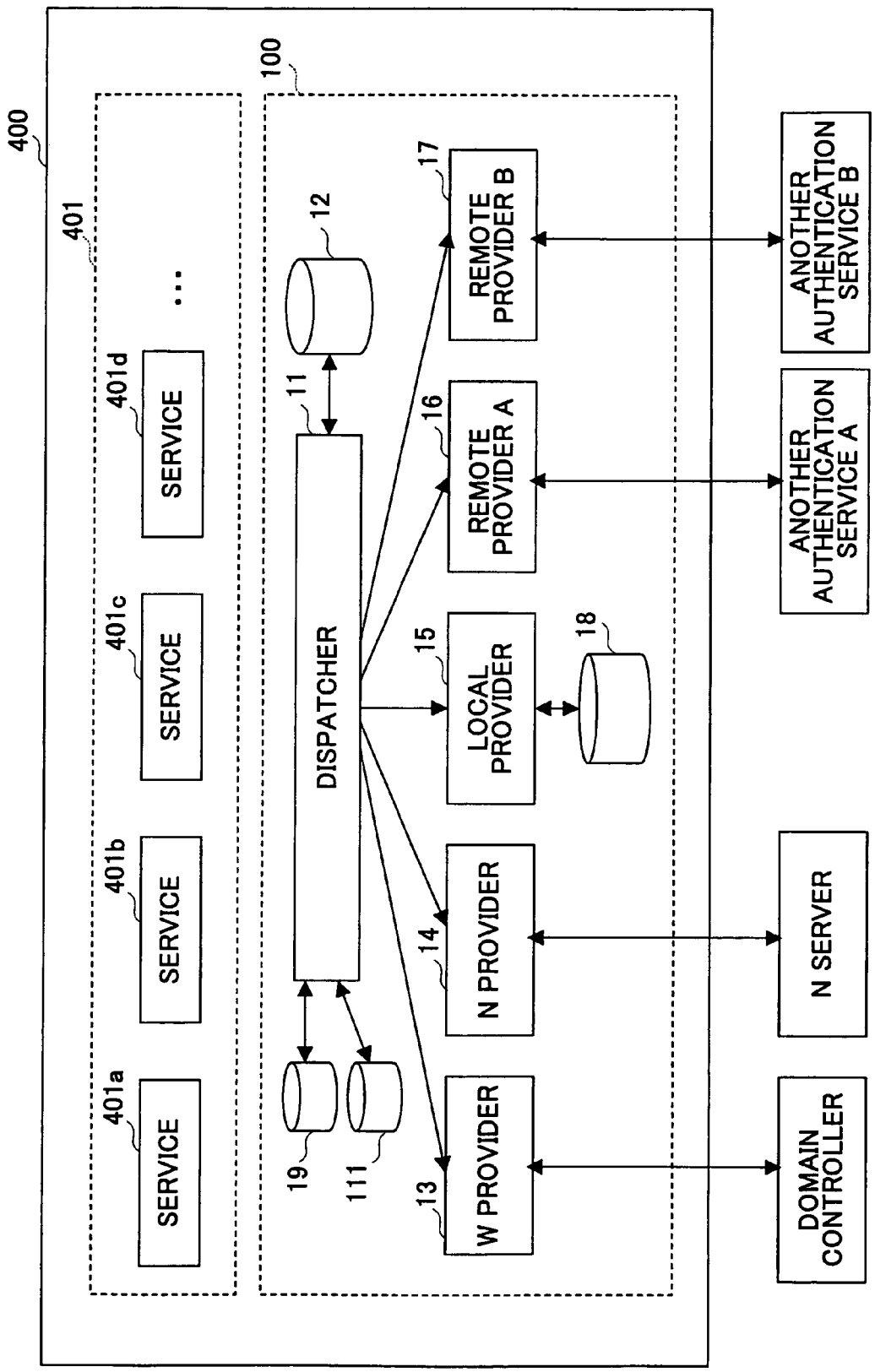
FIG. 25 is a drawing showing an example of the construction of an apparatus in which an authentication service is implemented according to the present embodiments.

The present invention may be applied to such a device. FIG. 25 is a drawing showing an example of the construction of an apparatus in which an authentication service is implemented according to the present embodiments. In FIG. 25, the same elements as those of FIG. 5 are referred to by the same numerals, and a description thereof will be omitted.

In FIG. 25, an apparatus 400 includes the authentication service 100, a service 401a, a service 401b, a service 401c, and a service 401d (hereinafter referred to as "service 401" when making general reference).

The service 401 is a program module for providing a service that is usable when the authentication service 100 provides proper authentication. In the case of a multifunction peripheral, for example, such service may be a document management service for providing document management functions, a printing service for providing printing functions, a delivery service for providing document delivery functions, etc. In this regard, the apparatus 400 may be regarded as having been configured by putting in a single housing all the functions that are distributed in the authentication servers 10a and 10b and the document management servers 20a and 20b in the document management system 1 of FIG. 3.

In FIG. 25, "another authentication service B" to which an authentication task is entrusted by the remote provider B 17 may be the authentication server 10a, the authentication server 10b, or another apparatus of the same type as the apparatus 400.

Further, the present invention is not limited to these embodiments, but various variations and modifications may be made without departing from the scope of the present invention.

The present application is based on Japanese priority applications No. 2004-017198 filed on Jan. 26, 2004, No. 2004-035001 filed on Feb. 12, 2004, and No. 2005-004399, filed on Jan. 11, 2005, with the Japanese Patent Office, the entire contents of which are hereby incorporated by reference.

What is claimed is:

1. An apparatus for managing user information regarding a plurality of users, comprising:
a source determining unit configured to receive from a client a request for obtaining first user information and to determine, based on user identifying information contained in the request, a source from which the first user information is to be obtained, the first user information including an indication of successful authentication of the client; and
at least one user information obtaining unit configured to serve as the source determined by said source determining unit to obtain the first user information,
wherein said at least one user information obtaining unit is configured to transmit the request for obtaining first user information to another apparatus via a network and receive via the network the first user information, including the indication obtained by said another apparatus, in response to the request for managing user information via a network.

2. The apparatus as claimed in claim 1, wherein said at least one user information obtaining unit includes entrusted-apparatus identifying information for identifying said another apparatus for managing user information.

3. The apparatus as claimed in claim 1, wherein the user identifying information contained in the request includes a domain name of a domain to which a user identified by the user identifying information belongs, said source determining unit is configured to determine, based on the domain name, the source from which the first user information is obtained.

4. The apparatus as claimed in claim 3, further comprisingl
a source identifying information managing unit configured to manage source identifying information separately for each said domain name, said source identifying information identifying a source from which the first user information is obtained, wherein said source determining unit is configured to determine, based on the domain name contained in the user identifying information and said source identifying information managing unit, the source from which the first user information is obtained.

5. The apparatus as claimed in claim 1, wherein the request for obtaining a first user information is an authentication request for authenticating a user identified by the user identifying information.

6. The apparatus as claimed in claim 5, wherein said at least one user information obtaining unit is configured to receive, from said another apparatus, first authentication information indicative of proper authentication of the user as a response to the authentication request transmitted to said another apparatus, and said source determining unit is configured to transmit to the client the first authentication information received by said at least one user information obtaining unit as a response to the request for obtaining first user information from the client.

7. An apparatus for managing user information, comprising:
a first authentication information providing unit configured to authenticate the user based on the user identifying information contained in the authentication request in response to the authentication request transmitted from the apparatus claimed in claim 6, and to provide the first authentication information in response to proper authentication of the user; and
a second authentication information providing unit configured to respond to a request for obtaining second user information, accompanied by the first authentication information, issued from the client that has received the first authentication information from said apparatus claimed in claim 6, to provide second authentication information that is to be required to be presented to a predetermined service when the client uses the predetermined service.

8. The apparatus as claimed in claim 7, wherein said second authentication information providing unit provides the second authentication information in an event that the first authentication information accompanying the request for obtaining second user information is one that the first authentication information providing unit has provided in response to the authentication request from said apparatus claimed in claim 6.

9. The apparatus as claimed in claim 7, further compr1sing an authentication information retaining unit configured to retain the first authentication information that is provided by said first authentication information providing unit, wherein said second authentication information providing unit provides the second authentication information in an event that the first authentication information accompanying the request for obtaining second user information is identical to the first authentication information retained by said authentication information retaining unit.

10. The apparatus as claimed in claim 7, wherein said second authentication information providing unit provides the second authentication information in an event that the first authentication information is before an expiry of a term of validity for providing the second authentication information.

11. The apparatus as claimed in claim 7, wherein the request for obtaining second user information is accompanied by service identifying information for identifying a service that is to be used by said client, and said second authentication information providing unit is configured to provide the second authentication information corresponding to the service identified by the service identifying information.

12. An apparatus for managing user information, comprising:
   a first authentication information providing unit configured to authenticate a user based on user identifying information contained in an authentication request in response to the authentication request sent from a second client, and to provide first authentication information indicative of proper authentication of the user in response to the proper authentication of the user; and
   a second authentication information providing unit configured to respond to a request for obtaining second user information issued from the apparatus claimed in claim 6 that has received the request for obtalijing second user information, accompanied by the first authentication information, issued from the second client, to provide second authentication information that is to be required to be presented to a predetermined service when the second client uses the predetermined service.

13. The apparatus as claimed in claim 12, wherein said second authentication information providing unit provides the second authentication information in an event that the first authentication information accompanying the request for obtaining second user information issued from the apparatus claimed in claim 6 is one that the first authentication information providing unit has provided in response to the authentication request from the second client.

14. The apparatus as claimed in claim 12, further comprising:
   an authentication information retaining unit configured to retain the first authentication information that is provided by said first authentication information providing unit, wherein said second authentication information providing unit provides the second authentication information in an event that the first authentication information accompanying the request for obtaining second user information is identical to the first authentication information retained by said authentication information retaining unit.

15. The apparatus as claimed in claim 12, wherein said second authentication information providing unit provides the second authentication information in an event that the first authentication information is before an expiry of a term of validity for providing the second authentication information.

16. The apparatus as claimed in claim 12, wherein the request for obtaining second user information is accompanied by service identifying information for identifying a service that is to be used by the second client, and said second authentication information providing unit is configured to provide the second authentication information corresponding to the service identified by the service identifying information.

17. A machine-readable medium having a program embodied therein for causing a computer to manage user information regarding a plurality of users, said program comprising:
   a source determining program-code unit configured to receive from a client a request for obtaining first user information and to determine, based on user identifying information contained in the request, a source from which the first user information is to be obtained the first user information including an indication of successful authentication of the client; and
   a user information obtaining program-code unit configured to obtain the first user information from the source determined by said source determining program-code unit, wherein said user information obtaining program-code unit is configured to transmit the request for obtaining first user information to another computer via a network and receive via the network the first user information, including the indication obtained by said another computer, in response to the request for managing user information via a network.

18. The machine-readable medium as claimed in claim 17, wherein the user identifying information contained in the request includes a domain name of a domain to which a user identified by the user identifying information belongs, said source determining program-code unit is configured to determine, based on the domain name, the source from which the first user information is obtained.

19. The machine-readable medium as claimed in claim 18, wherein said source determining program-code unit is configured to determine, based on the domain name contained in the user identifying information and source identifying information for identifying on a domain-name-specific basis a source from which the first user information is obtained, the source from which the first user information is obtained.

20. The machine-readable medium as claimed in claim 17, wherein the request for obtaining a first user information is an authentication request for authenticating a user identified by the user identifying information.

21. The machine-readable medium as claimed in claim 17, said program further comprising:
   a first authentication information receiving program-code unit configured to receive, from said another computer, first authentication information indicative of proper authentication of the user as a response to the authentication request transmitted to said another computer; and
   a first authentication information transmitting program-code unit configured to transmit to the client the first authentication information received by said first authentication information receiving program-code unit as a response to the request for obtaining first user information from the client.

22. A machine-readable medium having a program embodied therein for causing a computer to managing user information, said program comprising:
   a first authentication information providing program-code unit configured to authenticate the user based on the user identifying information contained in the authentication request in response to the authentication request transmitted from the apparatus claimed in claim 6, and to provide the first authentication information in response to proper authentication of the user; and
   a second authentication information providing program-code unit configured to respond to a request for obtaining second user information, accompanied by the first authentication information, issued from the client that has received the first authentication information from said apparatus claimed in claim 6, to provide second authentication information that is to be required to be presented to a predetermined service when the client uses the predetermined service.

23. The machine-readable medium as claimed in claim 22, wherein said second authentication information providing program-code unit provides the second authentication information in an event that the first authentication information accompanying the request for obtaining second user information is one that the first authentication information providing program-code unit has provided in response to the authentication request from said apparatus claimed in claim 6.

24. The machine-readable medium as claimed in claim 22, further comprising:

an authentication information retaining program-code unit configured to retain the first authentication information that is provided by said first authentication information providing program-code unit, wherein said second authentication information providing program-code unit provides the second authentication information in an event that the first authentication information accompanying the request for obtaining second user information is identical to the first authentication information retained by said authentication information retaining program-code unit.

25. The machine-readable medium as claimed in claim 22, wherein said second authentication information providing program-code unit provides the second authentication information in an event that the first authentication information is before an expiry of a term of validity for providing the second authentication information.

26. The machine-readable medium as claimed in claim 22, wherein the request for obtaining second user information is accompanied by service identifying information for identifying a service that is to be used by said client, and said second authentication information providing program-code unit is configured to provide the second authentication information corresponding to the service identified by the service identifying information.

27. A machine-readable medium having a program embodied therein for causing a computer to manage user information, said program comprising:

a first authentication information providing program-code unit configured to authenticate a user based on user identifying information contained in an authentication request in response to the authentication request sent from a second client, and to provide first authentication information indicative of proper authentication of the user in response to the proper authentication of the user; and a second authentication information providing program-code unit configured to respond to a request for obtaining second user information issued from the apparatus claimed in claim 6 that has received the request for obtaining second user information, accompanied by the first authentication information, issued from the second client, to provide second authentication information that is to be required to be presented to a predetermined service when the second client uses the predetermined service.

28. The machine-readable medium as claimed in claim 27, wherein said second authentication information providing program-code unit provides the second authentication information in an event that the first authentication information accompanying the request for obtaining second user information issued from the apparatus claimed in claim 6 is one that the first authentication information providing program-code unit has provided in response to the authentication request from the second client.

29. The machine-readable medium as claimed in claim 28, said program further comprising an authentication information retaining program-code unit configured to retain the first authentication information that is provided by said first authentication information providing program-code unit, wherein said second authentication information providing program-code unit provides the second authentication information in an event that the first authentication information accompanying the request for obtaining second user information is identical to the first authentication information retained by said authentication information retaining program-code unit.

30. The machine-readable medium as claimed in claim 27, wherein said second authentication information providing program-code unit provides the second authentication information in an event that the first authentication information is before an expiry of a term of validity for providing the second authentication information.

31. The machine-readable medium as claimed in claim 27, wherein the request for obtaining second user information is accompanied by service identifying information for identifying a service that is to be used by the second client, and said second authentication information providing program-code unit is configured to provide the second authentication information corresponding to the service identified by the service identifying information.

* * * * *